(12) United States Patent
Sun et al.

(10) Patent No.: US 12,362,885 B2
(45) Date of Patent: Jul. 15, 2025

(54) ACKNOWLEDGEMENT (ACK) AND NEGATIVE ACKNOWLEDGEMENT (NACK) REPORTING FOR A PHYSICAL DOWNLINK SHARED CHANNEL (PDSCH) GRANT

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/449,761

(22) Filed: Oct. 1, 2021

(65) Prior Publication Data

US 2022/0116184 A1    Apr. 14, 2022

Related U.S. Application Data

(60) Provisional application No. 63/198,341, filed on Oct. 12, 2020.

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1621* (2013.01); *H04L 1/1812* (2013.01); *H04L 1/1861* (2013.01); *H04W 72/23* (2023.01)

(58) Field of Classification Search
CPC ... H04L 5/0055; H04L 1/1812; H04L 1/1861; H04L 1/1854; H04L 1/1864;
(Continued)

(56) References Cited

U.S. PATENT DOCUMENTS

| 11,108,509 B2* | 8/2021 | Park | H04L 1/1614 |
| 2014/0301302 A1* | 10/2014 | Xu | H04L 1/1854 |
| | | | 370/329 |

(Continued)

FOREIGN PATENT DOCUMENTS

| EP | 3657712 A1 | 5/2020 |
| EP | 3833094 A1 | 6/2021 |

(Continued)

OTHER PUBLICATIONS

International Search Report and Written Opinion—PCT/US2021/071709—ISA/EPO—May 17, 2022.

(Continued)

*Primary Examiner* — Brian J. Gillis
*Assistant Examiner* — Chhian (Amy) Ling
(74) *Attorney, Agent, or Firm* — Arun Swain

(57) ABSTRACT

This disclosure provides systems, methods and apparatuses for using acknowledgement or negative acknowledgement (ACK-NACK) bundling when reporting from a user equipment (UE) a bundled ACK-NACK for a plurality of physical downlink shared channels (PDSCHs) associated with a PDSCH grant. A counter downlink assignment indicator (DAI) and a total DAI may be used to track PDSCH grants that are received at the UE. The UE may detect missing PDSCHs and report ACK-NACKs for the missing PDSCHs based on the counter DAI and the total DAI. A base station (BS) may transmit the PDSCH grant associated with the plurality of PDSCHs to the UE. The BS may receive, from the UE, the bundled ACK-NACK for the plurality of PDSCHs associated with the PDSCH grant.

30 Claims, 19 Drawing Sheets

(51) Int. Cl.
  *H04L 1/1812*    (2023.01)
  *H04L 1/1829*    (2023.01)
  *H04W 72/23*     (2023.01)

(58) Field of Classification Search
  CPC ..... H04L 1/1621; H04L 1/1896; H04L 5/001; H04L 5/0078; H04W 72/23; H04W 72/232
  See application file for complete search history.

(56) References Cited

U.S. PATENT DOCUMENTS

| | | | |
|---|---|---|---|
| 2018/0019843 A1 | 1/2018 | Papasakellariou | |
| 2019/0053265 A1* | 2/2019 | Kim | H04L 5/0044 |
| 2019/0081762 A1* | 3/2019 | Yang | H04L 1/1812 |
| 2019/0089494 A1* | 3/2019 | Park | H04L 1/1812 |
| 2020/0213980 A1* | 7/2020 | Takeda | H04L 1/1861 |
| 2021/0211237 A1* | 7/2021 | Yang | H04W 72/23 |
| 2021/0219329 A1 | 7/2021 | Zhou et al. | |
| 2021/0273749 A1* | 9/2021 | Papasakellariou | H04L 1/1864 |
| 2021/0307058 A1* | 9/2021 | Akkarakaran | H04W 72/0453 |
| 2021/0314990 A1* | 10/2021 | Takeda | H04W 72/20 |
| 2022/0095351 A1* | 3/2022 | Baldemair | H04W 72/23 |
| 2022/0159692 A1* | 5/2022 | Lee | H04L 5/0053 |
| 2022/0330297 A1* | 10/2022 | Lei | H04L 1/1812 |

FOREIGN PATENT DOCUMENTS

| | | |
|---|---|---|
| KR | 20200018353 A | 2/2020 |
| WO | WO-2011041623 A1 | 4/2011 |
| WO | WO-2020026291 A1 | 2/2020 |
| WO | WO-2020060367 A1 | 3/2020 |
| WO | WO-2020067815 A1 | 4/2020 |

OTHER PUBLICATIONS

Lenovo, et al., "Remaining Issues for HARQ Enhancement for NR-U", R1-2001974, 3rd Generation Partnership Project, Mobile Competence Centre, 650, Route Des Lucioles, F-06921 Sophia-Antipolis Cedex, France, vol. RAN WG1, No. E-Meeting, Apr. 20, 2020-Apr. 30, 2020 Apr. 10, 2020, XP051873392, 6 Pages.

LG Electronics: "HARQ Procedure for NR-U," 3GPP TSG RAN WG1 #98bis, R1-1910821 NR-U HARQ Final, 3rd Generation Partnership Project, Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019, XP051809211, 22 Pages.

Partial International Search Report—PCT/US2021/071709—ISA/EPO—Feb. 1, 2022.

* cited by examiner

ACKNOWLEDGEMENT (ACK) AND NEGATIVE ACKNOWLEDGEMENT (NACK) REPORTING FOR A PHYSICAL DOWNLINK SHARED CHANNEL (PDSCH) GRANT

CROSS-REFERENCE TO RELATED APPLICATION

This Patent application claims priority to U.S. Provisional Patent Application No. 63/198,341, filed on Oct. 12, 2020, entitled "ACKNOWLEDGEMENT (ACK) AND NEGATIVE ACKNOWLEDGEMENT (NACK) REPORTING FOR A PHYSICAL DOWNLINK SHARED CHANNEL (PDSCH) GRANT," and assigned to the assignee hereof. The disclosure of the prior Application is considered part of and is incorporated by reference into this Patent Application.

TECHNICAL FIELD

Aspects of the present disclosure relate generally to wireless communication and to techniques for acknowledgement and negative acknowledgement (ACK/NACK) reporting for a physical downlink shared channel (PDSCH) grant.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving, from a base station, downlink control information (DCI) configured to schedule a plurality of physical downlink shared channels (PDSCHs), where the DCI indicates: a PDSCH-to-hybrid automatic repeat request (HARQ) feedback timing value, and a physical uplink control channel (PUCCH) resource indicator (PRI) associated with a PUCCH resource; and transmitting, to the base station, HARQ feedback for the plurality of PDSCHs using the PUCCH resource.

One innovative aspect of the subject matter described in this disclosure can be implemented in a method of wireless communication performed by an apparatus of a UE. The method may include receiving, from a base station, DCI that includes a PDSCH grant for a plurality of PDSCHs; and transmitting, to the base station, an acknowledgement and negative acknowledgement (ACK-NACK) that is bundled for the plurality of PDSCHs via a PUCCH.

One innovative aspect of the subject matter described in this disclosure can be implemented in a method of wireless communication performed by an apparatus of a UE. The method may include receiving, from a base station, DCI that includes a PDSCH grant for a plurality of PDSCHs; identifying a virtual DCI associated with at least one PDSCH included in the plurality of PDSCHs; and transmitting, to the base station via a PUCCH, an ACK-NACK for the plurality of PDSCHs based on the virtual DCI.

Another innovative aspect of the subject matter described in this disclosure can be implemented in an apparatus of a UE for wireless communication. The apparatus may include a first interface configured to obtain DCI configured to schedule a plurality of PDSCHs, where the DCI indicates: a PDSCH-to-HARQ feedback timing value, and a PRI associated with a PUCCH resource. The apparatus may include the first interface or a second interface configured to output HARQ feedback for the plurality of PDSCHs using the PUCCH resource. The apparatus may be implemented to perform any of the method steps described herein.

Another innovative aspect of the subject matter described in this disclosure can be implemented in an apparatus of a UE for wireless communication. The apparatus may include a first interface configured to obtain DCI that includes a PDSCH grant for a plurality of PDSCHs. The apparatus may include the first interface or a second interface configured to output an ACK-NACK that is bundled for the plurality of PDSCHs via a PUCCH. The apparatus may be implemented to perform any of the method steps described herein.

Another innovative aspect of the subject matter described in this disclosure can be implemented in an apparatus of a UE for wireless communication. The apparatus may include a first interface configured to obtain DCI that includes a PDSCH grant for a plurality of PDSCHs. The apparatus may include a processing system configured to identify a virtual DCI associated with at least one PDSCH included in the plurality of PDSCHs. The apparatus may include the first interface or a second interface configured to output via a PUCCH an ACK-NACK for the plurality of PDSCHs based on the virtual DCI. The apparatus may be implemented to perform any of the method steps described herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a base station, DCI configured to schedule a plurality of PDSCHs, where the DCI indicates: a PDSCH-to-HARQ feedback timing value, and a PRI associated with a PUCCH resource; and transmit, to the base station, HARQ feedback for the plurality of PDSCHs using the PUCCH resource. The non-transitory computer-readable medium may be implemented to store one or more instructions, when executed by the one or more processors of the UE, to perform any of the method steps described herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a base station, DCI that includes a PDSCH grant for a plurality of PDSCHs; and transmit, to the base station, an ACK-NACK that is bundled for the plurality of PDSCHs via a PUCCH. The non-transitory computer-readable medium may be implemented to store one or more instructions, when executed by the one or more processors of the UE, to perform any of the method steps described herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a base station, DCI that includes a PDSCH grant for a plurality of PDSCHs; identify a virtual DCI associated with at least one PDSCH included in the plurality of PDSCHs; and transmit, to the base station via a PUCCH, an ACK-NACK for the plurality of PDSCHs based on the virtual DCI. The non-transitory computer-readable medium may be implemented to store one or more instructions, when executed by the one or more processors of the UE, to perform any of the method steps described herein.

Another innovative aspect of the subject matter described in this disclosure can be implemented in an apparatus for wireless communication. The apparatus may include means for receiving, from a base station, DCI configured to schedule a plurality of PDSCHs, where the DCI indicates: a PDSCH-to-HARQ feedback timing value, and a PRI associated with a PUCCH resource; and means for transmitting, to the base station, HARQ feedback for the plurality of PDSCHs using the PUCCH resource. The apparatus may be implemented to perform any of the method steps described herein.

Another innovative aspect of the subject matter described in this disclosure can be implemented in an apparatus for wireless communication. The apparatus may include means for receiving, from a base station, DCI that includes a PDSCH grant for a plurality of PDSCHs; and means for transmitting, to the base station, an ACK-NACK that is bundled for the plurality of PDSCHs via a PUCCH. The apparatus may be implemented to perform any of the method steps described herein.

Another innovative aspect of the subject matter described in this disclosure can be implemented in an apparatus for wireless communication. The apparatus may include means for receiving, from a base station, DCI that includes a PDSCH grant for a plurality of PDSCHs; means for identifying a virtual DCI associated with at least one PDSCH included in the plurality of PDSCHs; and means for transmitting, to the base station via a PUCCH, an ACK-NACK for the plurality of PDSCHs based on the virtual DCI. The apparatus may be implemented to perform any of the method steps described herein.

Another innovative aspect of the subject matter described in this disclosure can be implemented in a method of wireless communication performed by an apparatus of a base station. The method may include transmitting, to a UE, DCI configured to schedule a plurality of PDSCHs, where the DCI indicates: a PDSCH-to-HARQ feedback timing value, and a PRI associated with a PUCCH resource; and receiving, from the UE, HARQ feedback for the plurality of PDSCHs using the PUCCH resource.

Another innovative aspect of the subject matter described in this disclosure can be implemented in a method of wireless communication performed by an apparatus of a base station. The method may include transmitting, to a UE, DCI that includes a PDSCH grant for a plurality of PDSCHs; and receiving, from the UE, an ACK-NACK that is bundled for the plurality of PDSCHs via a PUCCH.

Another innovative aspect of the subject matter described in this disclosure can be implemented in a method of wireless communication performed by an apparatus of a base station. The method may include transmitting, to a UE, DCI that includes a PDSCH grant for a plurality of PDSCHs; and receiving, from the UE via a PUCCH, an ACK-NACK for the plurality of PDSCHs based on a virtual DCI associated with at least one PDSCH included in the plurality of PDSCHs.

Another innovative aspect of the subject matter described in this disclosure can be implemented in an apparatus of a base station for wireless communication. The apparatus may include a first interface configured to output DCI configured to schedule a plurality of PDSCHs, where the DCI indicates: a PDSCH-to-HARQ feedback timing value, and a PRI associated with a PUCCH resource. The apparatus may include the first interface or a second interface configured to obtain HARQ feedback for the plurality of PDSCHs using the PUCCH resource. The apparatus may be implemented to perform any of the method steps described herein.

Another innovative aspect of the subject matter described in this disclosure can be implemented in an apparatus of a base station for wireless communication. The apparatus may include a first interface configured to output DCI that includes a PDSCH grant for a plurality of PDSCHs. The apparatus may include the first interface or a second interface configured to obtain an ACK-NACK that is bundled for the plurality of PDSCHs via a PUCCH. The apparatus may be implemented to perform any of the method steps described herein.

Another innovative aspect of the subject matter described in this disclosure can be implemented in an apparatus of a base station for wireless communication. The apparatus may include a first interface configured to output DCI that includes a PDSCH grant for a plurality of PDSCHs. The apparatus may include the first interface or a second interface configured to obtain via a PUCCH an ACK-NACK for the plurality of PDSCHs based on a virtual DCI associated with at least one PDSCH included in the plurality of PDSCHs. The apparatus may be implemented to perform any of the method steps described herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to transmit, to a UE, DCI configured to schedule a plurality of PDSCHs, where the DCI indicates: a PDSCH-to-HARQ feedback timing value, and a PRI associated with a PUCCH resource; and receive, from the UE, HARQ feedback for the plurality of PDSCHs using the PUCCH resource. The non-transitory computer-readable medium may be implemented to store one or more instructions, when executed by the one or more processors of the base station, to perform any of the method steps described herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to transmit, to a UE, DCI that includes a PDSCH grant for a plurality of PDSCHs; and receive, from the UE, an ACK-NACK that is bundled for the plurality of PDSCHs via a PUCCH. The non-transitory computer-readable medium may be implemented to store one or more instructions, when executed by the one or more processors of the base station, to perform any of the method steps described herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to transmit, to a UE, DCI that includes a PDSCH grant for a plurality of PDSCHs; and receive, from the UE via a PUCCH, an ACK-NACK for the plurality of PDSCHs based on a virtual DCI associated with at least one PDSCH included in the plurality of PDSCHs. The non-transitory computer-readable medium may be implemented to store one or more instructions, when executed by the one or more processors of the base station, to perform any of the method steps described herein.

Another innovative aspect of the subject matter described in this disclosure can be implemented in an apparatus for wireless communication. The apparatus may include means for transmitting, to a UE, DCI configured to schedule a plurality of PDSCHs, where the DCI indicates: a PDSCH-to-HARQ feedback timing value, and a PRI associated with a PUCCH resource; and means for receiving, from the UE, HARQ feedback for the plurality of PDSCHs using the PUCCH resource. The apparatus may be implemented to perform any of the method steps described herein.

Another innovative aspect of the subject matter described in this disclosure can be implemented in an apparatus for wireless communication. The apparatus may include means for transmitting, to a UE, DCI that includes a PDSCH grant for a plurality of PDSCHs; and means for receiving, from the UE, an ACK-NACK that is bundled for the plurality of PDSCHs via a PUCCH. The apparatus may be implemented to perform any of the method steps described herein.

Another innovative aspect of the subject matter described in this disclosure can be implemented in an apparatus for wireless communication. The apparatus may include means for transmitting, to a UE, DCI that includes a PDSCH grant for a plurality of PDSCHs; and means for receiving, from the UE via a PUCCH, an ACK-NACK for the plurality of PDSCHs based on a virtual DCI associated with at least one PDSCH included in the plurality of PDSCHs. The apparatus may be implemented to perform any of the method steps described herein.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
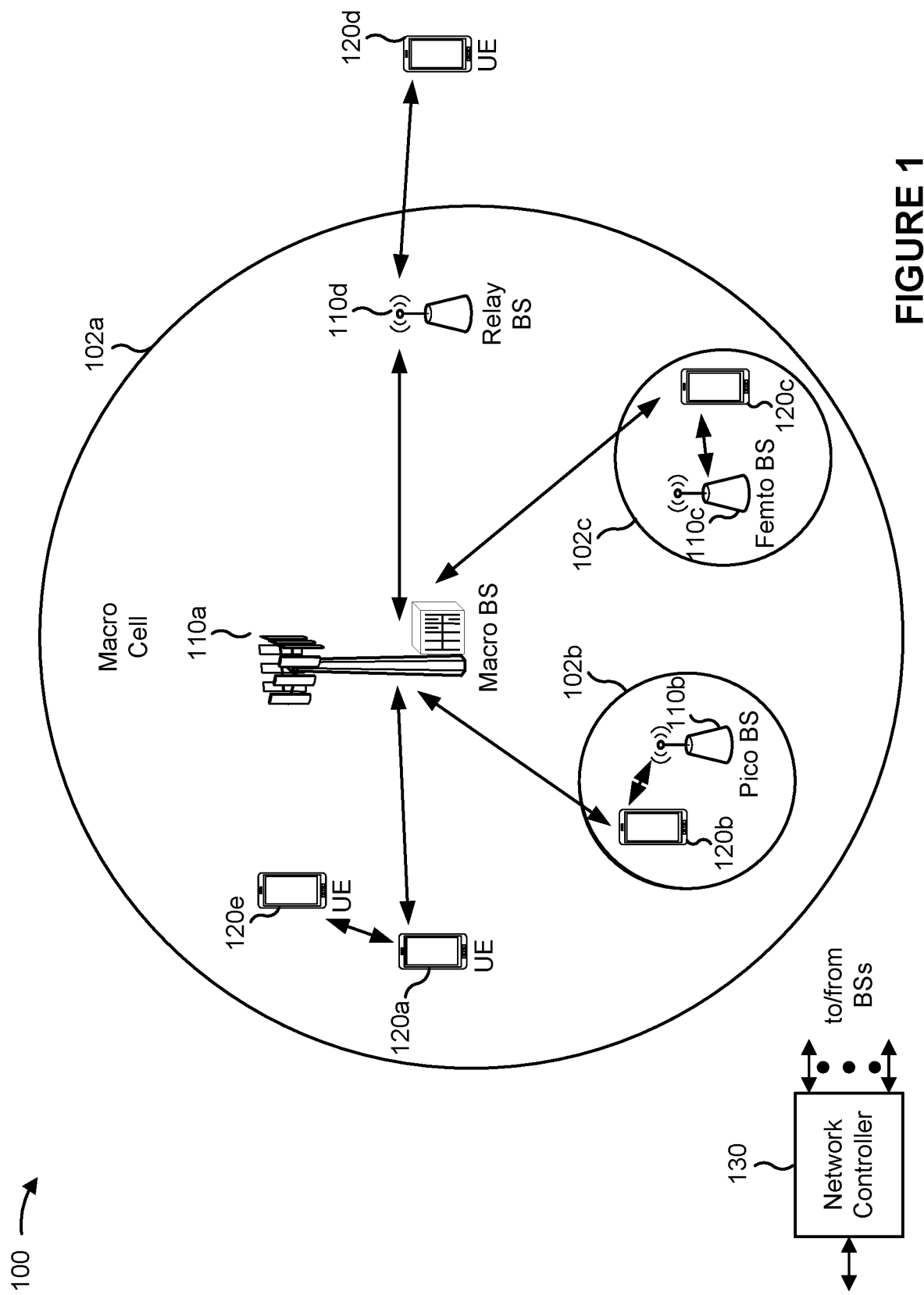
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (JOT) network, such as a system utilizing 3G technology, 4G technology, 5G technology, or further implementations thereof.

In New Radio Unlicensed (NR-U), a physical uplink shared channel (PUSCH) grant or multi-PUSCH grant may be used for control overhead saving. The multi-PUSCH grant, which may be included in downlink control information (DCI), may schedule multiple continuous PUSCH transmissions. The multiple continuous PUSCH transmissions may be associated with a common frequency domain resource allocation (FDRA), modulation and coding scheme (MCS), rank, and other various transmission parameters. The multiple continuous PUSCH transmissions may be associated with a starting position and an ending position, which may be provided by a time domain resource allocation (TDRA) that includes multiple start and length indicator values (SLIVs). The multi-PUSCH grant may indicate a first hybrid automatic repeat request (HARQ) process identifier (ID) and later transmissions may use an incremental HARQ process ID. Each PUSCH transmission may be associated with a separate new data indicator (NDI) and a separate compressed redundancy version indicator (RVID). Various design choices for the multi-PUSCH grant may be a compromise between scheduling flexibility and a length of the DCI that provides the multi-PUSCH grant.

A multi-PUSCH grant may be redesigned to serve as a multi-physical downlink shared channel (PDSCH) grant for control overhead saving. For a millimeter wave (mmWave) channel, slots may be associated with a shorter duration (as compared to other types of channels), and in particular when an increased subcarrier spacing (SCS) is used. The multi-PDSCH grant may enable a downlink burst of an increased duration to be scheduled, thereby reducing control overhead.

Some aspects of the multi-PUSCH grant may be employed for the multi-PDSCH grant. For example, a common FDRA, MCS, rank, precoding, and other various transmission parameters also may be used for the multi-PDSCH grant. The multi-PDSCH grant may indicate a first HARQ process ID and later transmissions may use an incremental HARQ process ID. Each PDSCH transmission may be associated with a separate NDI and a separate compressed RVID.

Some aspects of the multi-PDSCH grant are not defined in the multi-PUSCH grant. For example, with respect to the SLIV, one or more gaps may be configured between consecutive PDSCH transmissions, which may allow an opportunity for UE feedback by a served UE or other UEs. The one or more gaps also may allow an opportunity for downlink monitoring by the served UE, or a downlink control transmission to the served UE or other UEs. Another aspect of the multi-PDSCH grant that is not defined in the multi-PUSCH grant is the handling of a PDSCH-to-HARQ feedback timing value (K1), a physical uplink control channel (PUCCH) resource indicator (PRI) that indicates a PUCCH resource, and a downlink assignment indicator (DAI). The handling of the K1 value, the PRI, and the DAI is not defined for the PUSCH grant as the K1 value, the PRI, and the DAI are not available for the PUSCH grant.

For the multi-PDSCH grant, both a semi-static codebook and a dynamic codebook may be considered. Semi-static codebook reporting may be based on a set of K1 values, and this approach may be applicable for the multi-PDSCH grant, if the set of K1 values for semi-static codebook construction covers the possible PDSCH to PUCCH offsets. By configuring the set of K1 values, a multi-PDSCH grant length and a K1 value used for the multi-PDSCH grant, the semi-static codebook may be used without a redesign. However, for dynamic codebook reporting, a redesign may be employed because one downlink grant DCI may trigger one acknowledgement and negative acknowledgement (ACK-NACK) feedback in a single PDSCH grant, but a multi-PDSCH grant may grant multiple PDSCHs with each PDSCH corresponding to an ACK-NACK.

A base station may send multiple DCIS to a UE, where each DCI may include a multi-PDSCH grant. In some cases, the base station may attempt to send two DCIS to the UE corresponding to two separate multi-PDSCH grants, but either the first DCI or the second DCI may not be received at the UE. As a result, a first multi-PDSCH grant or a second multi-PDSCH grant may not be received at the UE. The UE may report via a PUCCH an ACK-NACK for the PDSCHs corresponding to the multi-PDSCH grant that was received, but the UE may be unable to determine when a multi-PDSCH grant that should have been received at the UE is actually missing at the UE. The base station, upon receiving the ACK-NACK from the UE, may be unable to determine whether the ACK-NACK is associated with the first multi-PDSCH grant or the second multi-PDSCH grant. In other words, the base station and the UE may not be aligned with respect to a number of ACK-NACK bits included in the PUCCH for the ACK-NACK reporting, as well as a position of an ACK-NACK for each PDSCH in the dynamic codebook.

In various aspects of techniques and apparatuses described herein, DCIs including multi-PDSCH grants may each be associated with a counter DAI. The counter DAI may enable the UE to track whether PDSCHs have not been received at the UE. When the UE determines that PDSCHs have not been received based on a counter DAI associated with a later received multi-PDSCH grant, the UE may report an ACK-NACK for multiple multi-PDSCH grants accordingly. For example, the UE may report a NACK for a missing multi-PDSCH grant. The UE may bundle the ACK-NACK for a plurality of PDSCHs associated with a particular multi-PDSCH grant, and report the bundled ACK-NACK during the PUCCH. The counter DAI may be employed when a single component carrier is configured, and the counter DAI and a total DAI may be employed when carrier aggregation is configured.

In various aspects of techniques and apparatuses described herein, the UE may bundle the ACK-NACK based on PDSCHs being associated with a single codeword or a multi-codeword. The UE may bundle the ACK-NACK based on whether spatial bundling is configured or not configured with respect to bundling the PDSCHs. The UE may bundle the ACK-NACK based on whether a code block group (CBG) ACK-NACK is configured or not configured.

In various aspects of techniques and apparatuses described herein, the UE may receive DCI that includes a multi-PDSCH grant, and the UE may associate one or more virtual DCI with the multi-PDSCH grant. The virtual DCI may be associated with a counter DAI. The counter DAI may enable the UE to track whether PDSCHs have not been received at the UE. When the UE determines that PDSCHs have not been received based on a counter DAI associated with a later received multi-PDSCH grant, the UE may report an ACK-NACK for PDSCHs associated with the multi-PDSCH grant. The counter DAI may be employed when a single component carrier is configured, and the counter DAI and a total DAI may be employed when carrier aggregation is configured.

Particular implementations of the subject matter described in this disclosure can be implemented to realize one or more of the following potential advantages. The UE may employ a counter DAI (and in some cases a total DAI mechanism) to track multi-PDSCH grants that are received at the UE and multi-PDSCH grants that are not received at the UE. Based on the counter DAI and the total DAI mechanisms, the UE may detect missing PDSCHs and report ACK-NACK(s) for the missing PDSCHs. The counter DAI and the total DAI mechanisms may be used in conjunction with ACK-NACK bundling. For example, the UE may use ACK-NACK bundling to report a bundled ACK-NACK for a plurality of PDSCHs associated with a multi-PDSCH grant, which may reduce signaling overhead between the UE and the base station. The ACK-NACK bundling may result in reduced ACK-NACJ overhead. In some cases, the counter DAI and the total DAI mechanisms may be used in conjunction with a virtual DCI mechanism. For example, the UE may associate virtual DCI to one or more PDSCHs associated with a multi-PDSCH grant, and the virtual DCI may indicate the counter DAI and the total DAI, which may enable the UE to detect missing PDSCHs and report ACK-NACK(s) for the missing PDSCHs. Further, the counter DAI and the total DAI mechanisms, along with the ACK-NACK bundling, may be beneficial for enabling the multi-PDSCH grant, where the multi-PDSCH grant may be associated with lower control overhead and may involve less PDCCH monitoring as compared to a single-PDSCH grant.

FIG. 1 is a diagram illustrating an example of a wireless network 100. The wireless network 100 may be or may include elements of a 5G (for example, NR) network or a 4G (for example, LTE) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LIE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

Figure 2:
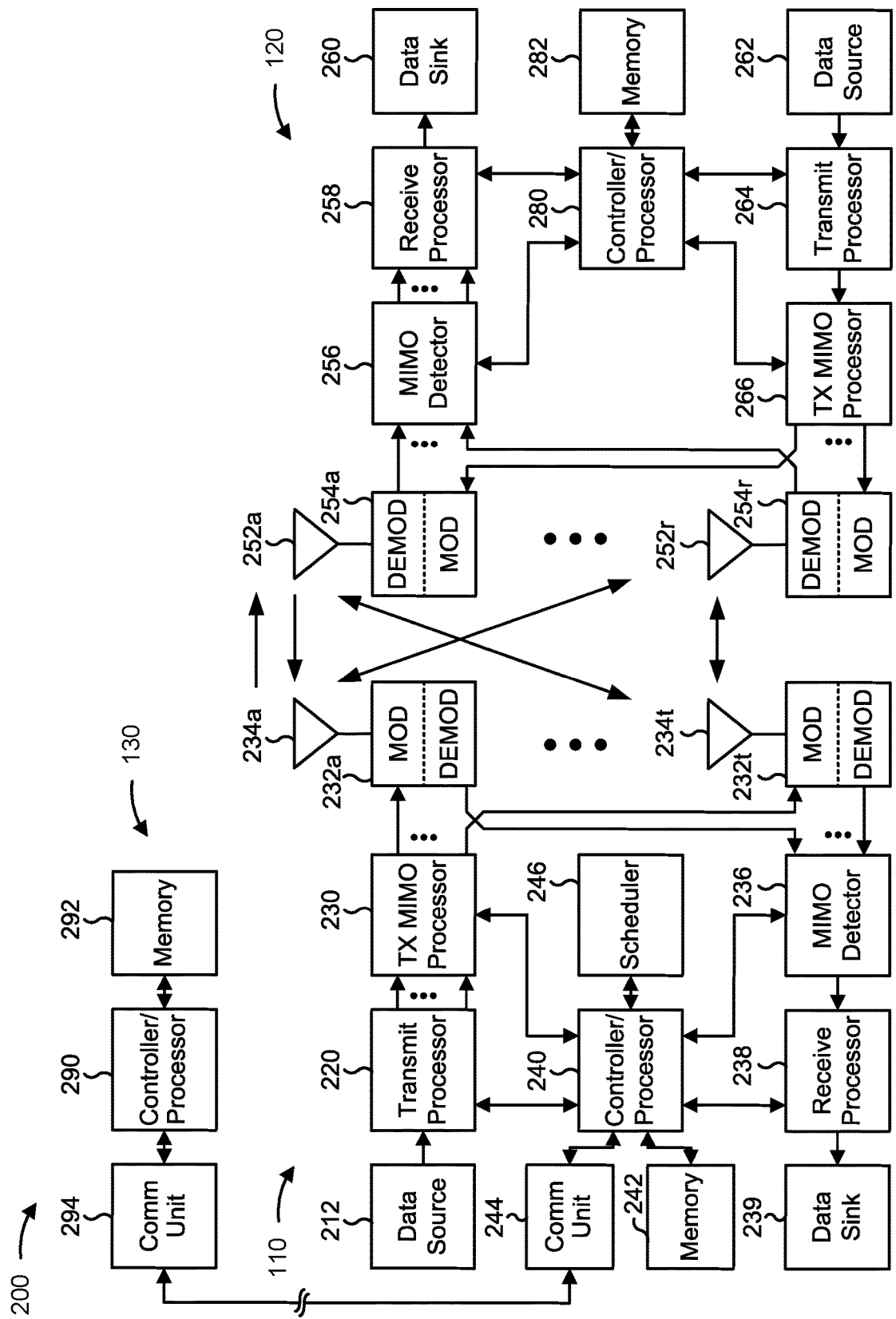
FIG. 2 is a diagram illustrating an example of a base station (BS) in communication with a user equipment (UE) in a wireless network.

FIG. 2 is a diagram illustrating an example 200 of a base station 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more MCSs for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the base station 110). For example, a processing system of the base station 110 may be a system that includes the various other components or subcomponents of the base station 110.

The processing system of the base station 110 may interface with one or more other components of the base station 110, may process information received from one or more other components (such as inputs or signals), or may output information to one or more other components. For example, a chip or modem of the base station 110 may include a processing system, a first interface to receive or obtain information, and a second interface to output, transmit, or provide information. In some examples, the first interface may be an interface between the processing system of the chip or modem and a receiver, such that the base station 110 may receive information or signal inputs, and the information may be passed to the processing system. In some examples, the second interface may be an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with ACK-NACK reporting for a downlink shared channel grant, as described in more detail elsewhere herein. For example, the controller/processor 240 of the base station 110, the controller/processor 280 of the UE 120, or any other component(s) (or combinations of components) of FIG. 2 may perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1200 of FIG. 12, process 1300 of FIG. 13, process 1400 of FIG. 14, process 1500 of FIG. 15, process 1600 of FIG. 16, process 1700 of FIG. 17, or other processes as described herein. In some examples, executing instructions may include running the instructions, converting the instructions, compiling the instructions, or interpreting the instructions.

In some aspects, the UE 120 may include means for receiving, from a base station, DCI configured to schedule a plurality of PDSCHs, where the DCI indicates: a PDSCH-to-HARQ feedback timing value, and a PRI associated with a PUCCH resource, means for transmitting, to the base station, HARQ feedback for the plurality of PDSCHs using the PUCCH resource, among other examples, or combinations thereof. In some aspects, such means may include one or more components of the UE 120 described in connection with FIG. 2, such as the controller/processor 280, the transmit processor 264, the TX MIMO processor 266, the MOD 254, one or more antennas 252, the DEMOD 254, the MIMO detector 256, or the receive processor 258.

In some aspects, the UE 120 may include means for receiving, from a base station, DCI that includes a PDSCH grant for a plurality of PDSCHs, means for transmitting, to the base station, an ACK-NACK that is bundled for the plurality of PDSCHs via a PUCCH, among other examples, or combinations thereof. In some aspects, such means may include one or more components of the UE 120 described in connection with FIG. 2, such as the controller/processor 280, the transmit processor 264, the TX MIMO processor 266, the MOD 254, one or more antennas 252, the DEMOD 254, the MIMO detector 256, or the receive processor 258.

In some aspects, the UE 120 may include means for receiving, from a base station, DCI that includes a PDSCH grant for a plurality of PDSCHs, means for identifying a virtual DCI associated with at least one PDSCH included in the plurality of PDSCHs, means for transmitting, to the base station via a PUCCH, an ACK-NACK for the plurality of PDSCHs based on the virtual DCI, among other examples, or combinations thereof. In some aspects, such means may include one or more components of the UE 120 described in connection with FIG. 2, such as the controller/processor 280, the transmit processor 264, the TX MIMO processor 266, the MOD 254, one or more antennas 252, the DEMOD 254, the MIMO detector 256, or the receive processor 258.

In some aspects, the base station 110 may include means for transmitting, to a UE, DCI configured to schedule a plurality of PDSCHs, where the DCI indicates: a PDSCH-to-HARQ feedback timing value, and a PRI associated with a PUCCH resource, means for receiving, from the UE, HARQ feedback for the plurality of PDSCHs using the PUCCH resource, among other examples, or combinations thereof. In some aspects, such means may include one or more components of the base station 110 described in connection with FIG. 2, such as one or more antennas 234, the DEMOD 232, the MIMO detector 236, the receive processor 238, the controller/processor 240, the transmit processor 220, the TX MIMO processor 230, the MOD 232, or the antenna 234, among other examples.

In some aspects, the base station 110 may include means for transmitting, to a UE, DCI that includes a PDSCH grant for a plurality of PDSCHs, means for receiving, from the UE, an ACK-NACK that is bundled for the plurality of PDSCHs via a PUCCH, among other examples, or combinations thereof. In some aspects, such means may include one or more components of the base station 110 described in connection with FIG. 2, such as one or more antennas 234, the DEMOD 232, the MIMO detector 236, the receive processor 238, the controller/processor 240, the transmit processor 220, the TX MIMO processor 230, the MOD 232, or the antenna 234, among other examples.

In some aspects, the base station 110 may include means for transmitting, to a UE, DCI that includes a PDSCH grant for a plurality of PDSCHs, means for receiving, from the UE via a PUCCH, an ACK-NACK for the plurality of PDSCHs based on a virtual DCI associated with at least one PDSCH included in the plurality of PDSCHs, among other examples, or combinations thereof. In some aspects, such means may include one or more components of the base station 110 described in connection with FIG. 2, such as one or more antennas 234, the DEMOD 232, the MIMO detector 236, the receive processor 238, the controller/processor 240, the transmit processor 220, the TX MIMO processor 230, the MOD 232, or the antenna 234, among other examples.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
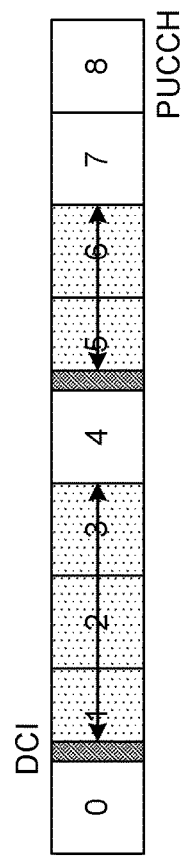
FIG. 3 is a diagram illustrating an example associated with a physical downlink shared channel (PDSCH) grant.

FIG. 3 is a diagram illustrating an example 300 associated with a PDSCH grant. The example(s) described in FIG. 3 may also be used in a multi-PDSCH grant. A base station (for example, the base station 110 depicted and described in FIGS. 1 and 2) may transmit to a UE (for example, the UE 120 depicted and described in FIGS. 1 and 2) a first DCI that includes a first multi-PDSCH grant, which may correspond to slots 1, 2, and 3. The base station may transmit to the UE a second DCI that includes a second multi-PDSCH grant, which may correspond to slots 5 and 6. A PUCCH may be scheduled after the PDSCHs corresponding to the first multi-PDSCH grant and the second multi-PDSCH grant, where the PUCCH may be used for ACK-NACK reporting.

A dynamic codebook may be designed such that the base station and the UE have an aligned knowledge on a number of ACK-NACK bits included in the PUCCH for the ACK-NACK reporting, as well as a position of an ACK-NACK for each PDSCH in the dynamic codebook. The number of ACK-NACK bits included in the PUCCH may refer to ACK-NACK bits corresponding to the first multi-PDSCH grant and ACK-NACK bits corresponding to the first multi-PDSCH grant.

Further, the dynamic codebook may be designed to provide robustness when one multi-PDSCH grant becomes missing. For example, the dynamic codebook may provide robustness when a second multi-PDSCH grant is received at the UE but a first multi-PDSCH grant is not received at the UE. In this case, the UE should be configured to include three negative acknowledgement (NACK) bits at a beginning of a five-bit codebook, where the three NACK bits correspond to the first multi-PDSCH grant that is not received and the two ACK-NACK bits correspond to the second multi-PDSCH grant that is received. In other words, when the UE receives the second multi-PDSCH grant alone, the UE should be configured to determine that the base station granted three PDSCHs before the two PDSCHs associated with the second multi-PDSCH grant, but the three PDSCHs were not received at the UE.

Figure 4:
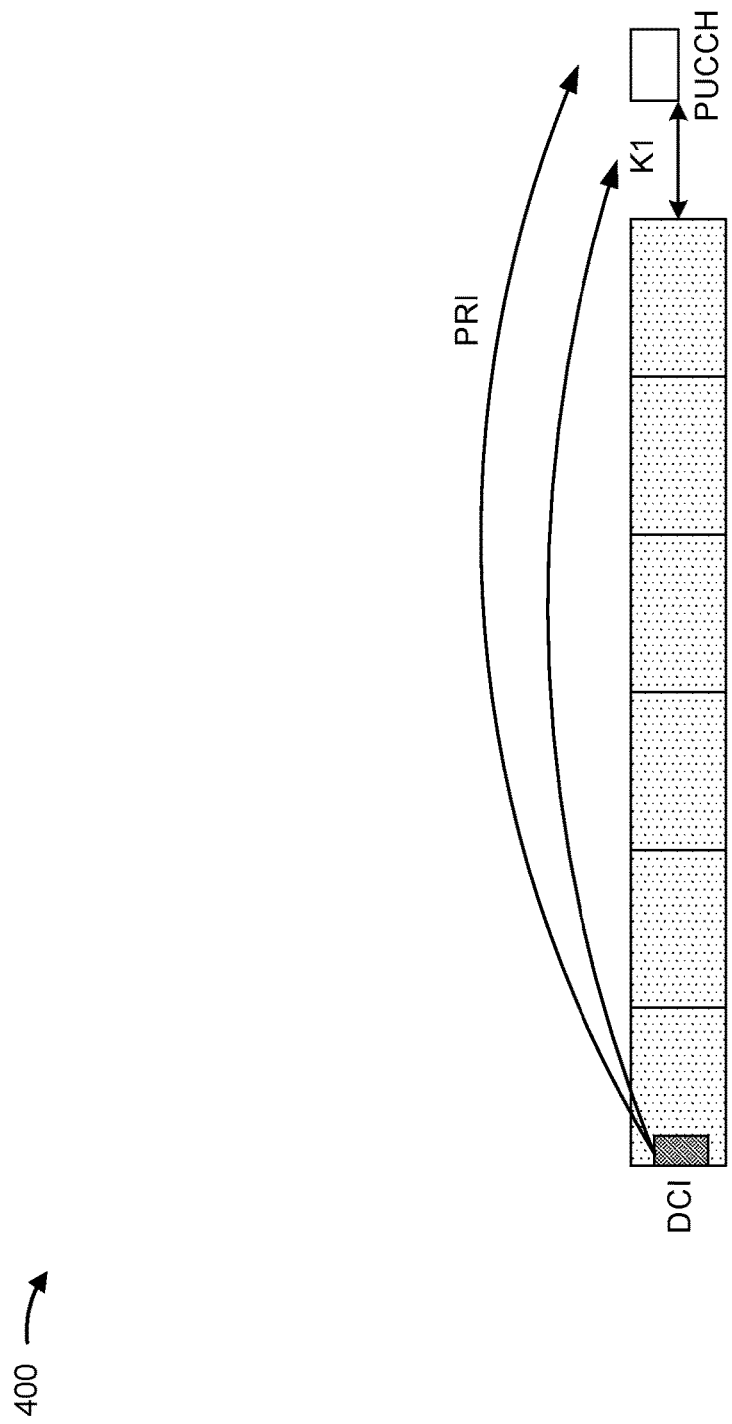
FIGS. 4-9 are diagrams illustrating examples associated with acknowledgement-negative acknowledgement (ACK-NACK) reporting with ACK-NACK bundling for a PDSCH grant.

FIG. 4 is a diagram illustrating an example 400 associated with ACK-NACK reporting with ACK-NACK bundling for a PDSCH grant. The example(s) described in FIG. 4 also may be used in a multi-PDSCH grant. A base station (for example, the base station 110 depicted and described in FIGS. 1 and 2) may transmit to a UE (for example, the UE 120 depicted and described in FIGS. 1 and 2) DCI that includes a multi-PDSCH grant. For example, the multi-PDSCH grant may schedule a plurality of consecutive PDSCHs. The DCI may include a K1 value, where K1 may indicate a feedback timing value between a last PDSCH in the plurality of consecutive PDSCHs and a PUCCH, which may be used for ACK-NACK reporting. The DCI may include a PRI that indicates the PUCCH (or a PUCCH resource) that may be used for the ACK-NACK reporting. The UE may transmit HARQ feedback using the PUCCH, as indicated by the K1 value and the PRI included in the DCI. The HARQ feedback may include an ACK-NACK for the multi-PDSCH grant.

In some aspects, transmitting the DCI with the K1 value and the PRI may result in a reduced control overhead but may result in an increased feedback delay. In some cases, transmitting the DCI with the K1 value and the PRI may be similar to a multi-PUSCH grant design in which a single K2 value may be provided indicating a timing offset from a multi-PUSCH grant to a first PUSCH transmission.

One problem with the multi-PDSCH grant is that a feedback size associated with ACK-NACK reporting for the multi-PDSCH grant may be variable due to the variable number of PDSCHs associated with the multi-PDSCH grant. The variability of the feedback size associated with the ACK-NACK reporting may present challenges to the UE and base station when implementing the multi-PDSCH grant. In some aspects, to resolve the problem, the feedback size associated with the ACK-NACK reporting may be fixed such that the feedback size may correspond to a feedback size associated with ACK-NACK reporting for a single PDSCH grant. The feedback size associated with the ACK-NACK reporting may be fixed based on ACK-NACK bundling. For example, ACK-NACK for PDSCHs indicated in the multi-PDSCH grant may be bundled to be the same size as a single PDSCH grant to be included in a dynamic codebook. Further, the multi-PDSCH grant(s) may follow a counter/total DAI mechanism, which may be used by the UE to detect a missing PDSCH grant. When detecting the missing PDSCH grant based on the counter/total DAI mechanism, the UE may assign a fixed number of NACKs to the missing PDSCH grant. In other words, the UE may patch holes in the codebook (for example, the semi-static codebook or the dynamic codebook) by assigning the fixed number of NACKs to the missing PDSCH grant.

Figure 5:
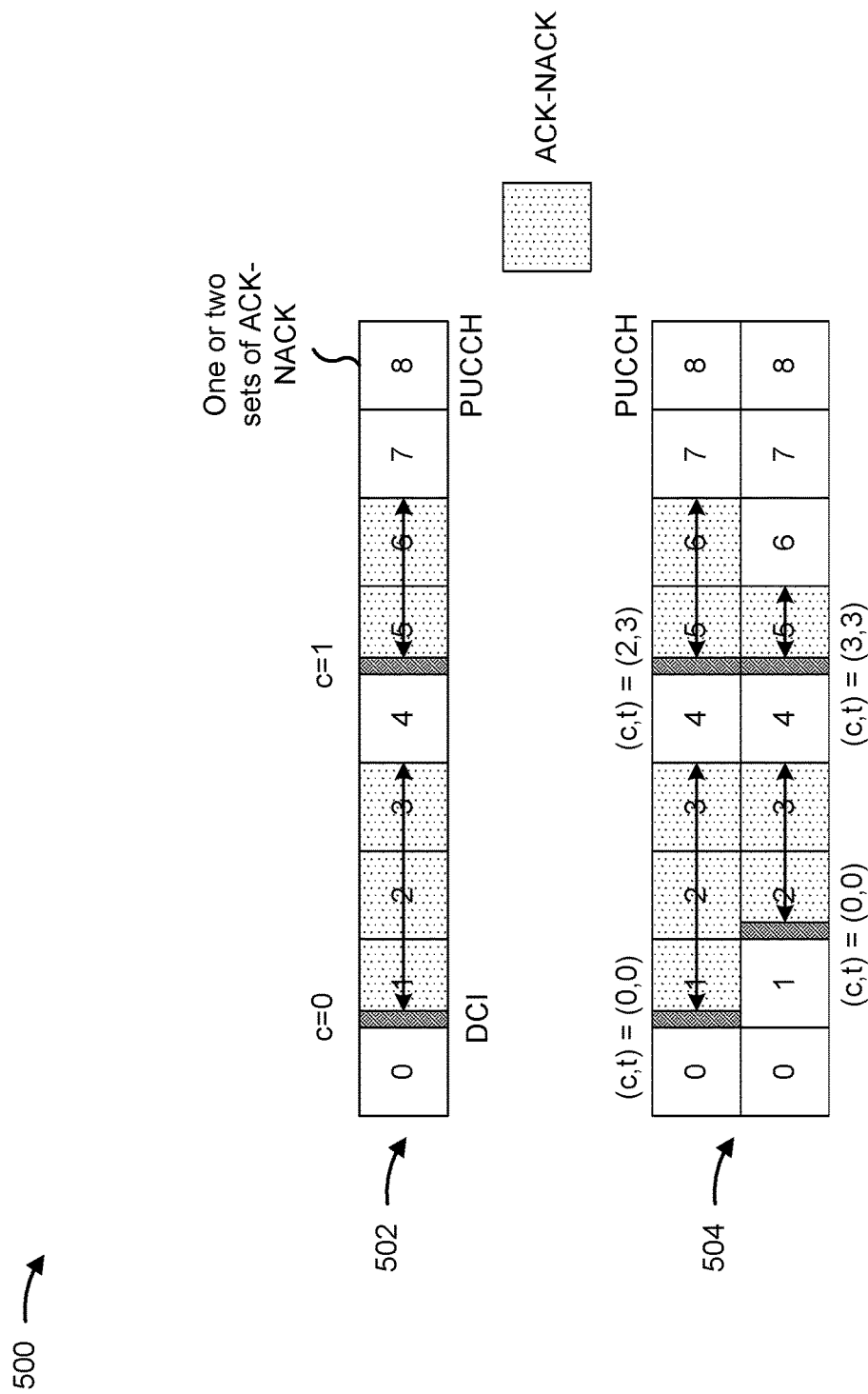

FIG. 5 is a diagram illustrating an example 500 associated with ACK-NACK reporting with ACK-NACK bundling for PDSCH grant. The example(s) described in FIG. 5 also may be used in a multi-PDSCH grant. A UE (for example, the UE 120 depicted and described in FIGS. 1 and 2) may transmit an ACK-NACK report with ACK-NACK bundling to a base station (for example, the base station 110 depicted and described in FIGS. 1 and 2) based on the multi-PDSCH grant received from the base station.

In some aspects, the UE may perform the ACK-NACK reporting when a single component carrier and a counter DAI is configured by the base station. In some aspects, the UE may perform the ACK-NACK reporting when the UE is configured for carrier aggregation, and both the counter DAI and a total DAI are configured by the base station.

As shown by reference number 502, for the single component carrier case, the base station may transmit, to the UE, a first DCI and a second DCI. The first DCI may include a first multi-PDSCH grant that grants three PDSCHs with a counter DAI equal to zero. The three PDSCHs may correspond to slots 1, 2 and 3. The second DCI may include a second multi-PDSCH grant that grants two PDSCHs with a counter DAI equal to one. The two PDSCHs may correspond to slots 5 and 6. In some aspects, when the UE receives both the first multi-PDSCH grant and the second multi-PDSCH grant, the UE may report two sets of ACK-NACK in a PUCCH. For example, the UE may transmit the two sets of ACK-NACK to the base station in the PUCCH, which may correspond to slot 8.

In some aspects, when the UE receives the second multi-PDSCH grant but not the first multi-PDSCH grant, the UE may determine from the counter DAI equal to one associated with the second multi-PDSCH grant that an earlier multi-PDSCH grant, such as the first multi-PDSCH grant, was not received at the UE or is missing at the UE. In this case, the UE may fill a set of NACKs before the ACK-NACK reporting for the second multi-PDSCH grant. In other words, the UE may associate the NACK(s) with the first multi-PDSCH grant, which was not received at the UE. The UE may not know a number of PDSCHs associated with the first multi-PDSCH grant. However, since the UE may bundle the NACK(s) for the first multi-PDSCH grant that was not received at the UE, the number of PDSCHs associated with the first multi-PDSCH grant may be irrelevant to the UE.

In some aspects, the UE may receive the first multi-PDSCH grant but not the second multi-PDSCH grant. The UE may report one set of ACK-NACK in the PUCCH in slot 8, where the one set of ACK-NACK may correspond to the first multi-PDSCH grant but not the second multi-PDSCH grant. The counter DAI associated with the first multi-PDSCH grant may not enable the UE to detect when the second multi-PDSCH grant is missing. In this case, a codebook size mismatch may occur between the UE and the base station.

As shown by reference number 504, for the carrier aggregation case, the base station may transmit, to the UE, a first DCI and a second DCI on a first component carrier, as well as a third DCI and a fourth DCI on a second component carrier. The first DCI may be associated with a first multi-PDSCH grant that grants three PDSCHs corresponding to slots 1, 2 and 3. The second DCI may be associated with a second multi-PDSCH grant that grants two PDSCHs corresponding to slots 5 and 6. The third DCI may be associated with a third multi-PDSCH grant that grants two PDSCHs corresponding to slots 2 and 3. The fourth DCI may be associated with a fourth multi-PDSCH grant that grants a single PDSCH corresponding to slot 5. The first DCI, the second DCI, the third DCI, and the fourth DCI may each be associated with both a counter DAI and a total DAI, which may enable the UE to detect missing multi-PDSCH grant(s), similar to the single component carrier case. Further, the UE may perform ACK-NACK reporting for both the first component carrier and the second component carrier in a PUCCH associated with the first component carrier.

Figure 6:
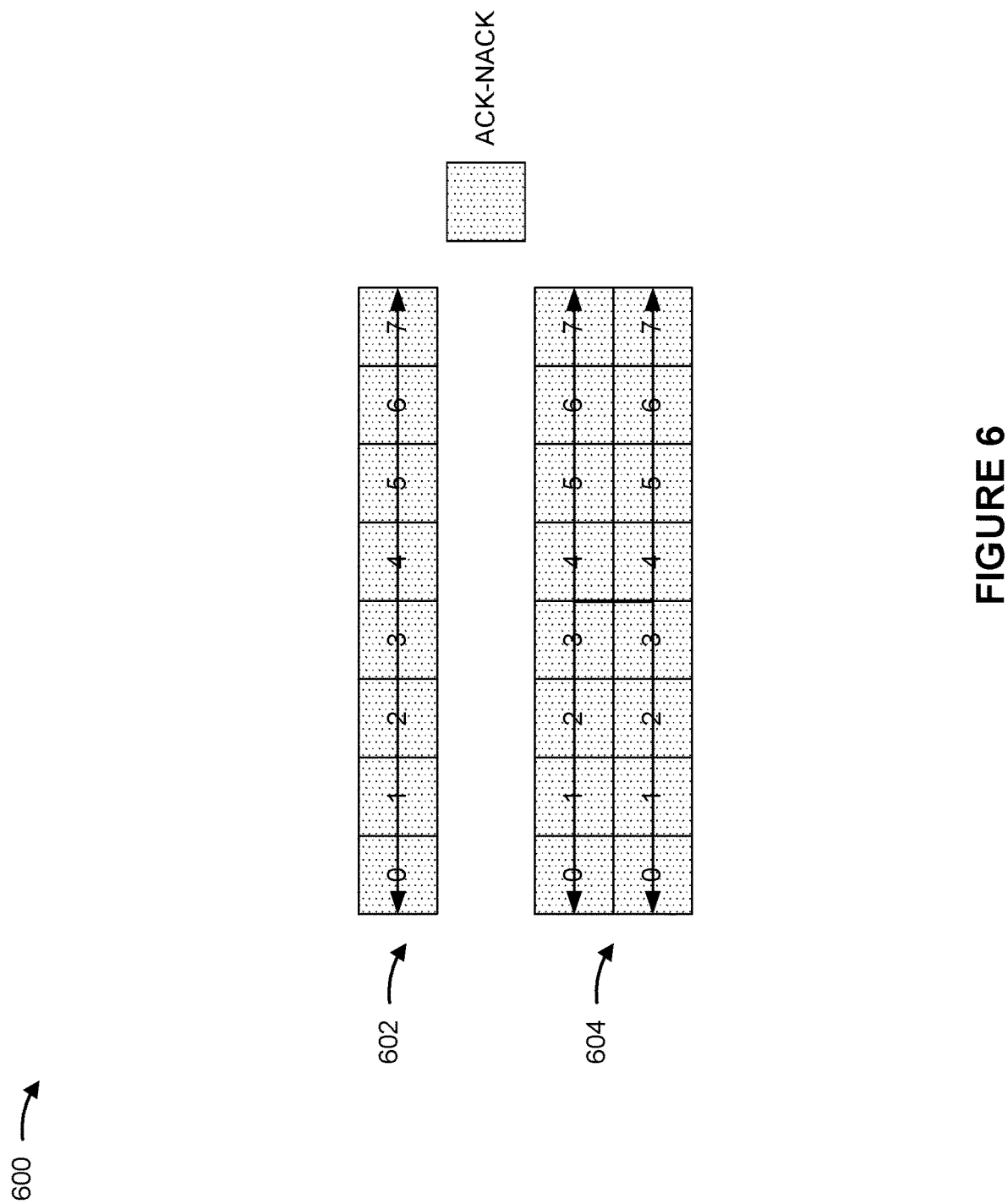

FIG. 6 is a diagram illustrating an example 600 associated with ACK-NACK reporting with ACK-NACK bundling for a PDSCH grant. The example(s) described in FIG. 6 also may be used in a multi-PDSCH grant. A UE (for example, the UE 120 depicted and described in FIGS. 1 and 2) may transmit an ACK-NACK report with ACK-NACK bundling to a base station (for example, the base station 110 depicted and described in FIGS. 1 and 2) based on the multi-PDSCH grant received from the base station.

As shown by reference number 602, the UE may report a single ACK-NACK bit per DCI. The single ACK-NACK bit may be associated with a single codeword, and a code block group may not be configured for the UE. In this case, the single ACK-NACK bit may correspond to slots associated with PDSCHs in the time domain. As shown by reference number 602, the single ACK-NACK bit may be a bundled ACK-NACK associated with slots 0 to 7 in the time domain.

As shown by reference number 604, the UE may report a single ACK-NACK bit per DCI. The single ACK-NACK bit may be associated with a multi-codeword with spatial bundling, and a CBG may not be configured for the UE. Spatial bundling may be used when the single ACK-NACK bit corresponds to slots that span across the frequency domain. As shown by reference number 604, the single ACK-NACK bit may be a bundled ACK-NACK associated with slots 0 to 7 of a first component carrier and slots 0 to 7 of a second component carrier.

In some aspects, ACK-NACK bundling for a multi-PDSCH grant may be NACK when at least one transport block (TB) of at least one PDSCH associated with the multi-PDSCH grant is NACK.

Figure 7:
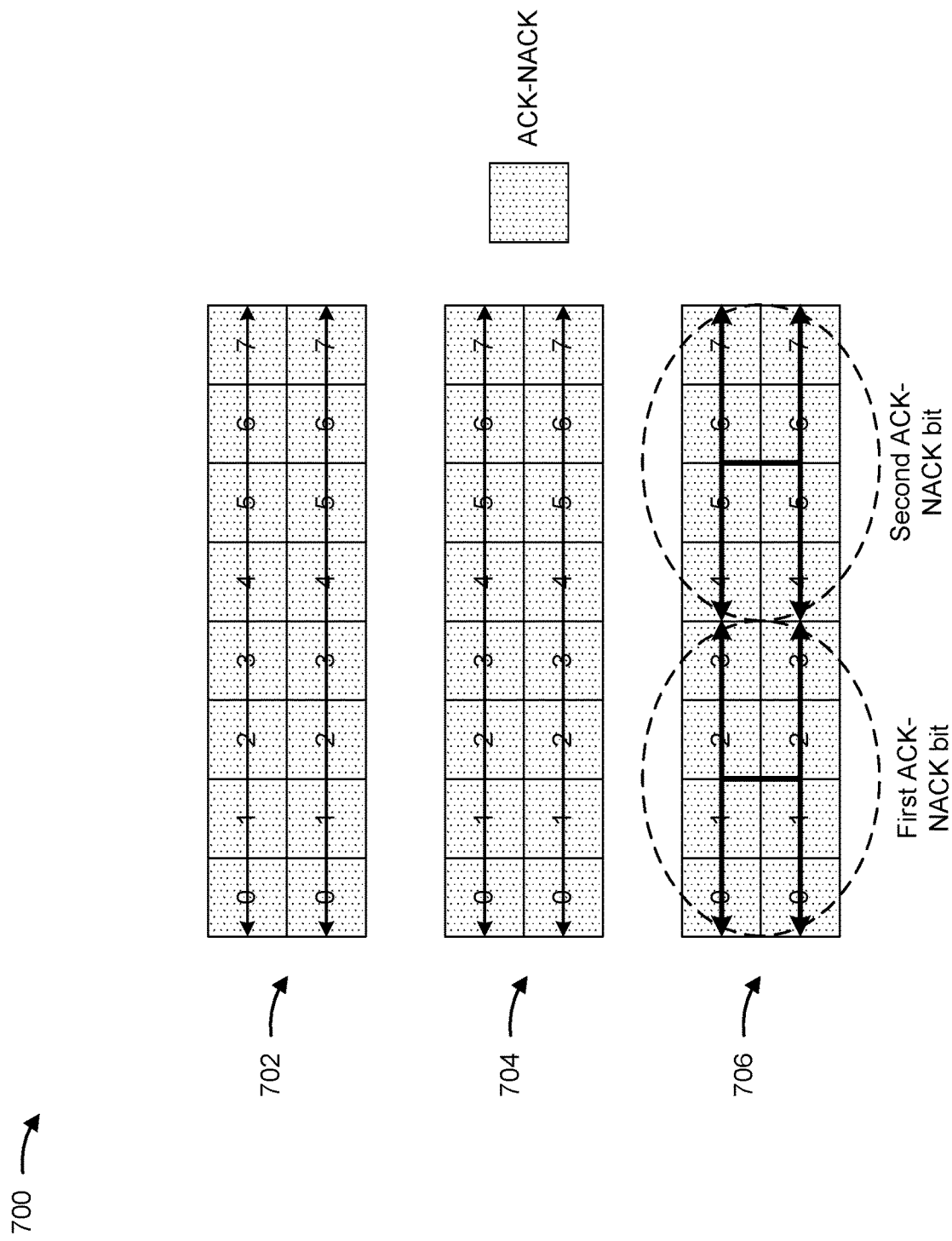

FIG. 7 is a diagram illustrating an example 700 associated with ACK-NACK reporting with ACK-NACK bundling for a PDSCH grant. The example(s) described in FIG. 7 also may be used in a multi-PDSCH grant. A UE (for example, the UE 120 depicted and described in FIGS. 1 and 2) may transmit an ACK-NACK report with ACK-NACK bundling to a base station (for example, the base station 110 depicted and described in FIGS. 1 and 2) based on the multi-PDSCH grant received from the base station.

In some aspects, a multi-codeword may be configured for the UE, and a CBG ACK-NACK may not be configured for the UE. In this case, the UE may report two ACK-NACK bits per PDSCH.

As shown by reference number 702, the UE may report the two ACK-NACK bits using ACK-NACK bundling across PDSCHs in the time domain. In this case, the ACK-NACK bundling performed by the UE may not be spatial bundling. In other words, the ACK-NACK bundling may not be performed in the frequency domain. In some aspects, when a single codeword is used by the UE (no more than rank four), one of the two ACK-NACK bits may correspond to a NACK. As shown by reference number 702, a first ACK-NACK bit may be a bundled ACK-NACK associated with slots 0 to 7 of a first component carrier (for example, a NACK), and a second ACK-NACK bit may be a bundled ACK-NACK associated with slots 0 to 7 of a second component carrier.

As shown by reference number 704, the UE may report the two ACK-NACK bits using ACK-NACK bundling across PDSCHs in the time domain and without spatial bundling. In this case, the two ACK-NACK bits may be associated with a multi-codeword. As shown by reference number 704, a first ACK-NACK bit may be a bundled ACK-NACK associated with slots 0 to 7 of a first component carrier, and a second ACK-NACK bit may be a bundled ACK-NACK associated with slots 0 to 7 of a second component carrier.

As shown by reference number 706, the UE may report the two ACK-NACK bits using ACK-NACK bundling. In this case, the two ACK-NACK bits may be associated with a multi-codeword. Further, the ACK-NACK bundling performed by the UE may use spatial bundling in the frequency domain and across PDSCHs in the time domain. For example, the ACK-NACK bundling may be performed spatially, and then a number of PDSCHs may be evenly split in the time domain for ACK-NACK bundling. The number of PDSCHs may be evenly split based on a first half and a second half, based on even PDSCHs and odd PDSCHs, or other mechanisms. As shown by reference number 706, a first ACK-NACK bit may be a spatially bundled ACK-NACK associated with slots 0 to 3 of a first component carrier and slots 0 to 3 of a second component carrier, and a second ACK-NACK bit may be a spatially bundled ACK-NACK associated with slots 4 to 7 of the first component carrier and slots 4 to 7 of the second component carrier.

Figure 8:
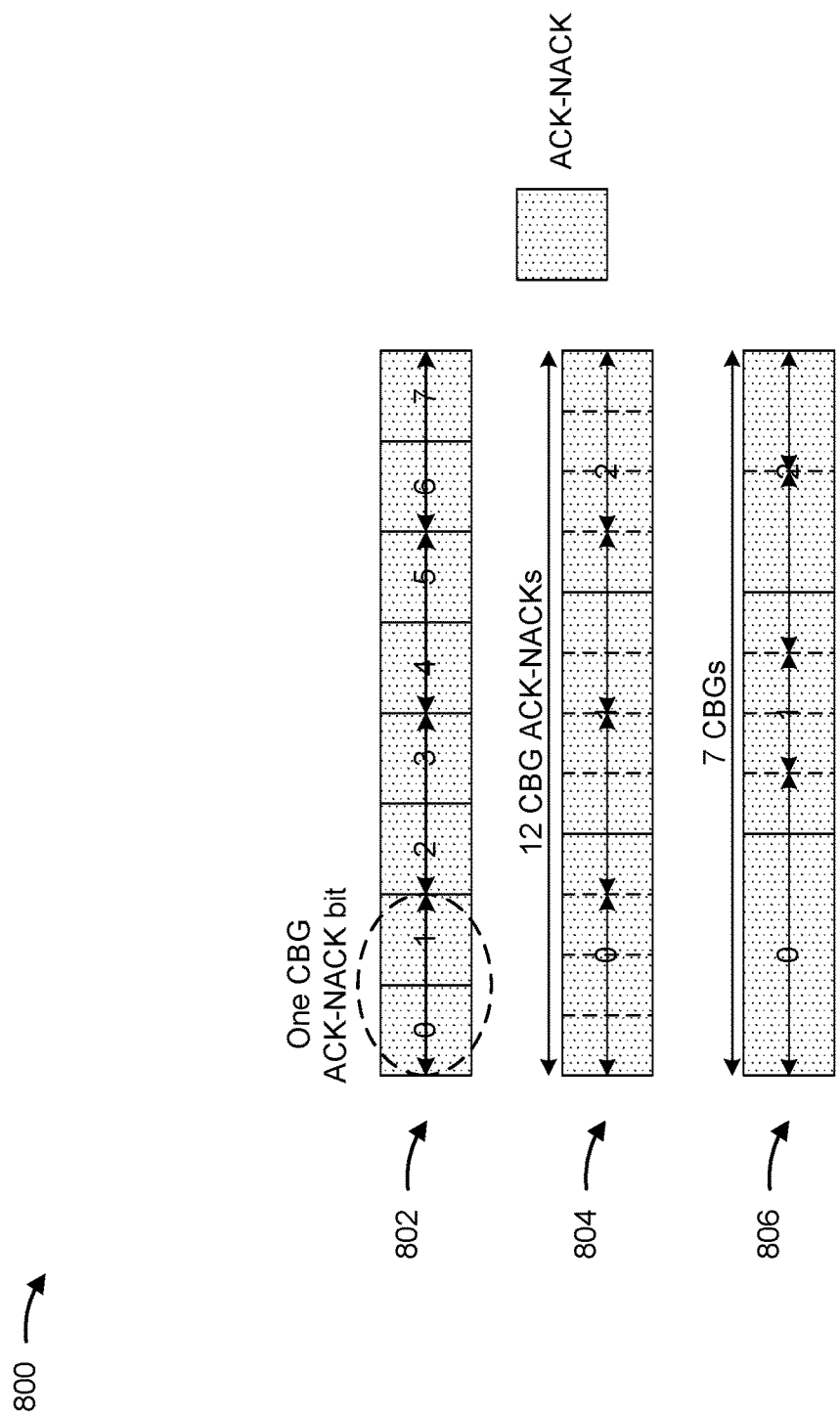

FIG. 8 is a diagram illustrating an example 800 associated with ACK-NACK reporting with ACK-NACK bundling for a PDSCH grant. The example(s) described in FIG. 8 also may be used in a multi-PDSCH grant. A UE (for example, the UE 120 depicted and described in FIGS. 1 and 2) may transmit an ACK-NACK report with ACK-NACK bundling to a base station (for example, the base station 110 depicted and described in FIGS. 1 and 2) based on the multi-PDSCH grant received from the base station.

In some aspects, a CBG ACK-NACK may be configured with a single codeword for the UE. In some aspects, with the CBG ACK-NACK and the single codeword, the ACK-NACK bundling may fall back to a TB level feedback for the multi-PDSCH grant, in which TBs may be distributed to available CBG ACK-NACK bits. In some aspects, with the CBG ACK-NACK and the single codeword, the ACK-NACK bundling may involve aggregating a plurality of CBG ACK-NACKs from a plurality of PDSCHs and bundling CBG level ACK-NACKs. For example, all CBG ACK-NACKs from all PDSCHs may be aggregated. In some aspects, with the CBG ACK-NACK and the single codeword, the ACK-NACK bundling may involve aggregating the plurality of CBG ACK-NACKs from the plurality of PDSCHs and bundling ACK-NACKs based on an actual number of CBGs per TB.

As shown by reference number 802, the ACK-NACK bundling may fall back to the TB level feedback for the multi-PDSCH grant, in which TBs may be distributed to available CBG ACK-NACK bits. In this specific example, four CBG ACK-NACK bits may be configured for the UE. In some aspects, when a number of PDSCHs is less than the number of CBG ACK-NACK bits configured for the UE, some of the CBG ACK-NACK bits may be padded with NACK. In some aspects, when the number of PDSCHs is more than the number of CBG ACK-NACK bits configured for the UE, ACK-NACK bundling may be applied with approximately equal number of TBs per CBG ACK-NACK bit. As shown by reference number 802, the four CBG ACK-NACK bits may include a first CBG ACK-NACK bit that corresponds to slots 0 and 1, a second CBG ACK-NACK bit that corresponds to slots 2 and 3, a third CBG ACK-NACK bit that corresponds to slots 4 and 5, and a fourth CBG ACK-NACK bit that corresponds to slots 6 and 7.

As shown by reference number 804, the ACK-NACK bundling may involve aggregating the plurality of CBG ACK-NACKs from the plurality of PDSCHs and bundling the CBG level ACK-NACKs. In this specific example, three PDSCHs may be granted by a multi-PDSCH grant, and four CBG ACK-NACKs may be configured for the UE. As shown by reference number 804, a total of twelve CBG ACK-NACKs across the three PDSCHs may be bundled every three CBG ACK-NACKs together to form the four bundled CBG ACK-NACKs.

As shown by reference number 806, the ACK-NACK bundling may involve aggregating the plurality of CBG ACK-NACKs from the plurality of PDSCHs and bundling ACK-NACKs based on the actual number of CBGs per TB. In some cases, some PDSCHs may actually have less CBGs than configured, which may occur when a payload size is reduced so the actual number of CBGs is less than the configured number of CBGs. In this specific example, three PDSCHs may be granted by a multi-PDSCH grant, and four CBG ACK-NACKs may be configured for the UE. In this example, the first PDSCH may have one CBG, the second PDSCH may have four CBGs, and the third PDSCH may have two CBGs. As shown by reference number 806, a total of seven CBGs may be split into the four CBG ACK-NACKs, such that two CBGs may be associated with a first CBG ACK-NACK, two CBGs may be associated with a second CBG ACK-NACK, two CBGs may be associated with a third CBG ACK-NACK, and one CBG may be associated with a fourth CBG ACK-NACK.

Figure 9:
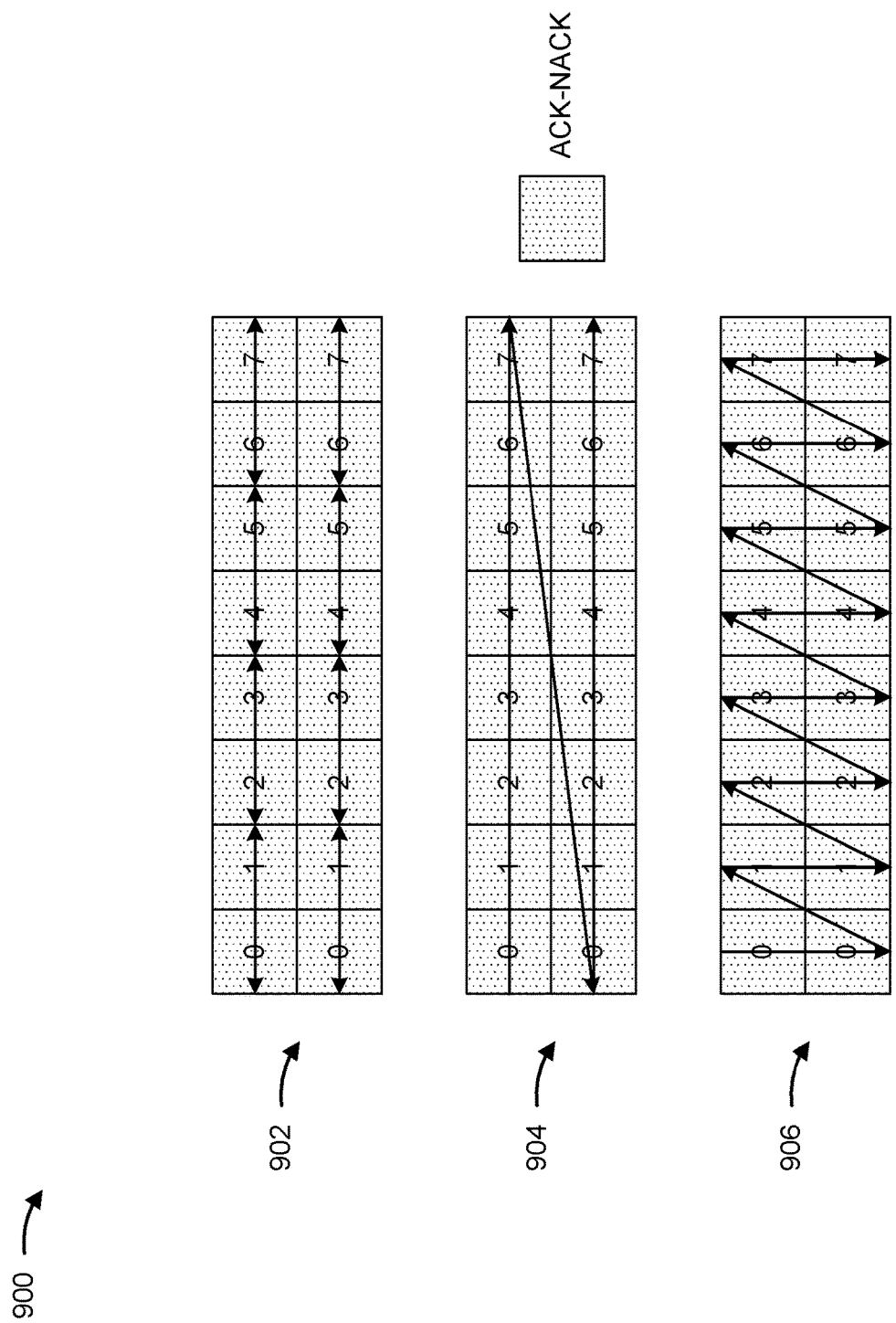

FIG. 9 is a diagram illustrating an example 900 associated with ACK-NACK reporting with ACK-NACK bundling for a PDSCH grant. The example(s) described in FIG. 9 also may be used in a multi-PDSCH grant. A UE (for example, the UE 120 depicted and described in FIGS. 1 and 2) may transmit an ACK-NACK report with ACK-NACK bundling to a base station (for example, the base station 110 depicted and described in FIGS. 1 and 2) based on the multi-PDSCH grant received from the base station.

In some aspects, a CBG ACK-NACK may be configured with spatial multi-codewords for the UE, such as two codewords. For a single PDSCH case, a same number of CBG ACK-NACK bits may be configured per codeword, irrespective of whether the codeword is used or not.

As shown by reference number 902, the ACK-NACK bundling may involve no spatial bundling. For each codeword, the ACK-NACK bundling may fall back to a TB level feedback for the multi-PDSCH grant in which TBs may be distributed to available CBG ACK-NACK bits, the ACK-NACK bundling may involve aggregating a plurality of CBG ACK-NACKs from a plurality of PDSCHs and bundling CBG level ACK-NACKs, or the ACK-NACK bundling may involve aggregating the plurality of CBG ACK-NACKs from the plurality of PDSCHs and bundling ACK-NACKs based on an actual number of CBGs per TB. In this example, when a codeword is not used for one multi-PDSCH transmission, a plurality of CBG ACK-NACKs (for example, all of the CBG ACK-NACKs) for that codeword may be NACK. As shown by reference number 902, pairs of slots (for example, slots 0 and 1, slots 2 and 3 of, and so on) associated with a first component carrier may be ACK-NACK bundled in the time domain, and pairs of slots (for example, slots 0 and 1, slots 2 and 3 of, and so on) associated with a second component carrier may be ACK-NACK bundled in the time domain.

As shown by reference number 904, the ACK-NACK bundling may involve aggregating PDSCHs and then aggregating the codeword(s). In some aspects, the ACK-NACK bundling may involve aggregating TBs across codewords into a common pool and bundling the TBs to available CBG ACK-NACKs (or feedbacks). In some aspects, the ACK-NACK bundling may involve aggregating CBGs across codewords into a common pool and bundling the CBGs to available CBG ACK-NACKs (or feedbacks). In some aspects, the ACK-NACK bundling may involve aggregating an actual number of CBGs across codewords into a common pool and bundling the actual number of CBGs to available CBG ACK-NACKs (or feedbacks). As shown by reference number 904, ACK-NACKs for slots 0 to 7 of a first component carrier may be bundled in the time domain, and then may be spatially bundled with ACK-NACKs for slots 0 to 7 of a second component carrier that are bundled in the time domain.

As shown by reference number 906, the ACK-NACK bundling may involve aggregating the codeword(s) and then aggregating PDSCHs. In some aspects, the ACK-NACK bundling may involve aggregating TBs across codewords into a common pool and bundling the TBs to available CBG ACK-NACKs (or feedbacks). In some aspects, the ACK-NACK bundling may involve aggregating CBGs across codewords into a common pool and bundling the CBGs to available CBG ACK-NACKs (or feedbacks). In some aspects, the ACK-NACK bundling may involve aggregating an actual number of CBGs across codewords into a common pool and bundling the actual number of CBGs to available CBG ACK-NACKs (or feedbacks). As shown by reference number 906, ACK-NACKs for slot 0 across the first and second component carriers may be spatially bundled, and then may be bundled with ACK-NACKs for slot 1 across the first and second component carriers that are spatially bundled, and so on.

In some aspects, a multi-PDSCH grant may be associated with virtual DCI, which may result in a reduced amount of lost information as compared to ACK-NACK bundling. For example, each PDSCH in a multi-PDSCH grant other than a first PDSCH may be associated with a virtual DCI. The virtual DCI may not actually be transmitted from the base station to the UE, but may be identified at the UE based on the multi-PDSCH grant. A counter DAI and a total DAI in the multi-PDSCH grant may be associated with the first PDSCH granted by the multi-PDSCH grant, where a counter DAI and a total DAI in the virtual DCI(s) may consider an associated PDSCH.

As an example, a multi-PDSCH grant may be transmitted from the base station to the UE in slot 0, where the multi-PDSCH grant may schedule PDSCHs in slots 0, 1, 2, and 3. The UE may identify virtual DCI in slots 1, 2, and 3, which may virtually schedule the PDSCHs in slots 1, 2, and 3, respectively. The UE may identify the virtual DCI(s) based on the multi-PDSCH grant received from the base station.

Figure 10:
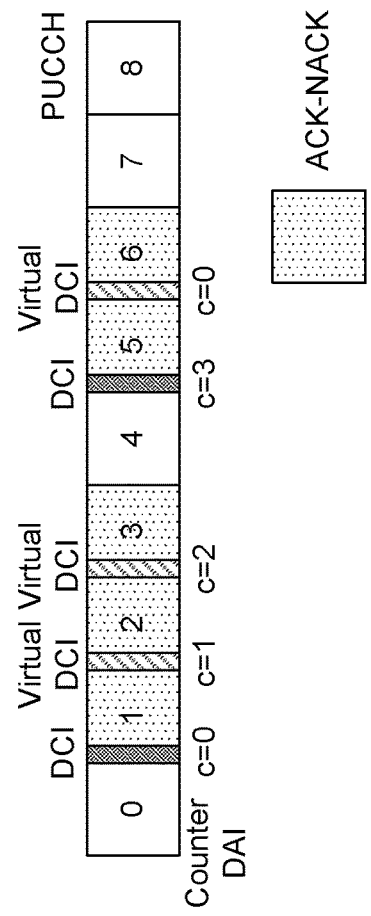
FIGS. 10-11 are diagrams illustrating examples associated with ACK-NACK reporting for a PDSCH grant associated with virtual downlink control information (DCI).

FIG. 10 is a diagram illustrating an example 1000 associated with ACK-NACK reporting for a PDSCH grant associated with virtual DCI. The example(s) described in FIG. 10 also may be used in a multi-PDSCH grant. A UE (for example, the UE 120 depicted and described in FIGS. 1 and 2) may receive the multi-PDSCH grant from a base station (for example, the base station 110 depicted and described in FIGS. 1 and 2). The UE may associate one or more virtual DCI based on the multi-PDSCH grant. The UE may transmit an ACK-NACK report to the base station based on the virtual DCI associated with the multi-PDSCH grant.

As shown in FIG. 10, for a single component carrier case, the base station may transmit, to the UE, a first DCI and a second DCI. The first DCI may include a first multi-PDSCH grant that grants three PDSCHs with a counter DAI equal to zero. The three PDSCHs may correspond to slots 1, 2 and 3. When the UE detects the first DCI, the UE may associate two virtual DCIs for the last two PDSCHs out of the three PDSCHs granted. The two virtual DCIs identified by the UE may not actually be transmitted by the base station. A first virtual DCI associated with a second PDSCH out of the three PDSCHs granted may include a counter DAI equal to one, which may be an increment from an actual DCI counter DAI associated with the first DCI. A second virtual DCI associated with a third PDSCH out of the three PDSCHs granted may include a counter DAI equal to two, which may be an increment from the first virtual DCI counter DAI (for example, the counter DAI associated with the first virtual DCI). The first DCI may not include a total DAI.

As shown in FIG. 10, the second DCI may include a second multi-PDSCH grant that grants two PDSCHs. The three PDSCHs may correspond to slots 5 and 6. The second DCI may include a counter DAI equal to three. The counter DAI associated with the second DCI may be incremental from the second virtual DCI counter DAI (for example, the counter DAI associated with the second virtual DCI). In some aspects, when the UE detects the second DCI, the UE may associate a third virtual DCI for the last PDSCH out of the two PDSCHs granted. The third virtual DCI identified by the UE may not actually be transmitted by the base station. The third virtual DCI may include a counter DAI equal to zero, which may be an increment from an actual DCI counter DAI associated with the second DCI.

In some aspects, when the UE receives the second multi-PDSCH grant but not the first multi-PDSCH grant, the UE may determine from the counter DAI equal to three associated with the second multi-PDSCH grant that an earlier multi-PDSCH grant, such as the first multi-PDSCH grant, was not received at the UE. Based on the counter DAI equal to three associated with the second multi-PDSCH grant, the UE may determine that three PDSCH grants (including actual grant(s) and virtual grant(s)) are missing at the UE. In this case, the UE may fill a set of NACKs for the missing PDSCH grants (for example, three sets of NACK for the three missing PDSCH grants). The UE may send the NACKs for the missing PDSCH grants and ACK-NACKs for the second multi-PDSCH grant in a PUCCH. The UE may not know a configuration associated with the missing PDSCH grants, for example, whether the three missing PDSCH grants are associated with one multi-PDSCH grant that grants three PDSCHs, or whether the three missing PDSCH grants are associated with three separate PDSCH grants each granting one PDSCH, or vice versa. However, the configuration associated with the three missing PDSCH grants may not affect the codebook generated by the UE.

In some aspects, the UE may receive the first multi-PDSCH grant but not the second multi-PDSCH grant. The UE may report three sets of ACK-NACK in the PUCCH, where the three sets of ACK-NACK may correspond to the first multi-PDSCH grant but not the second multi-PDSCH grant. In this case, a codebook size mismatch may occur between the UE and the base station.

Figure 11:
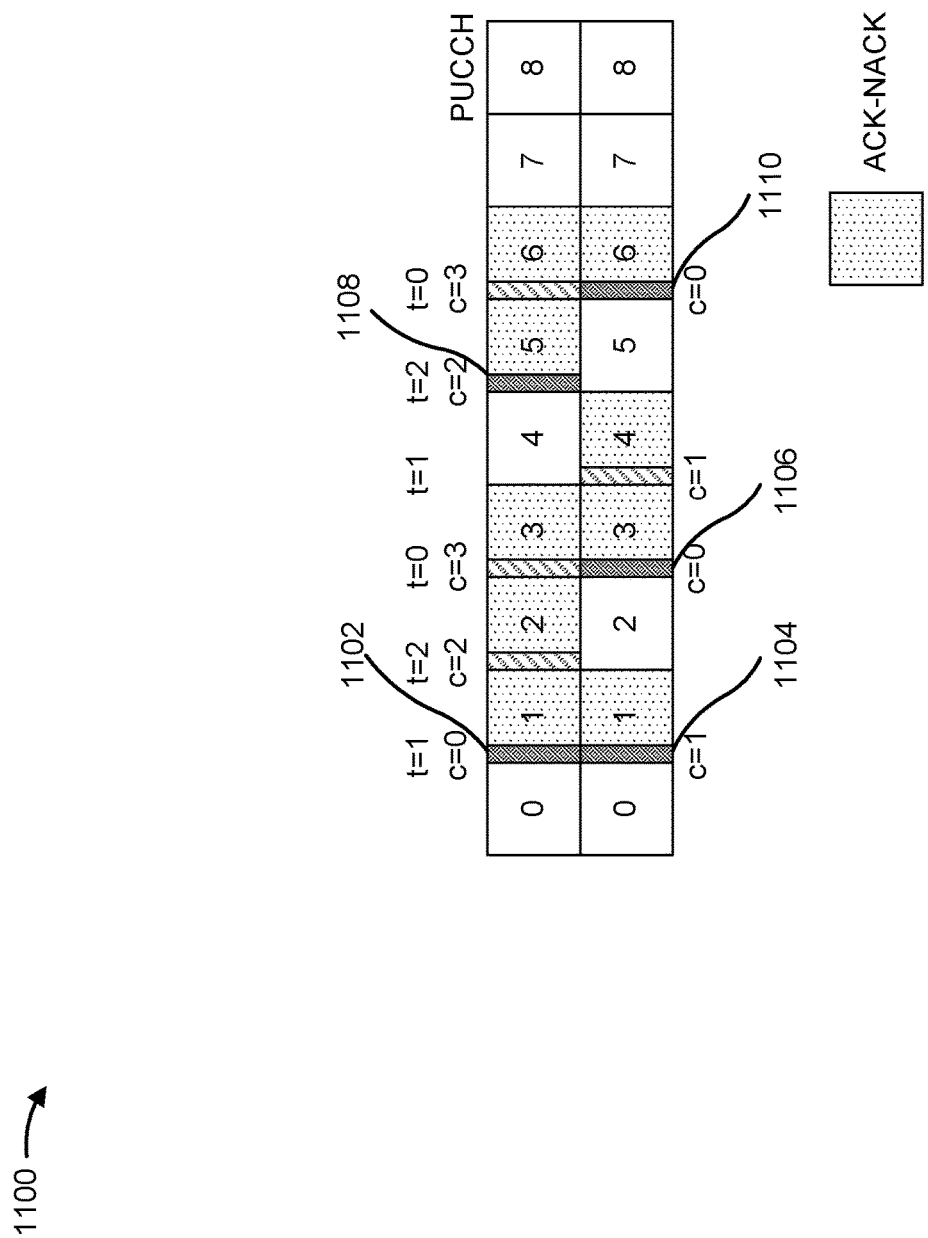

FIG. 11 is a diagram illustrating an example 1100 associated with ACK-NACK reporting for a PDSCH grant associated with virtual DCI. The example(s) described in FIG. 11 also may be used in a multi-PDSCH grant. A UE (for example, the UE 120 depicted and described in FIGS. 1 and 2) may receive the multi-PDSCH grant from a base station (for example, the base station 110 depicted and described in FIGS. 1 and 2). The UE may associate one or more virtual DCI based on the multi-PDSCH grant. The UE may transmit an ACK-NACK report to the base station based on the virtual DCI associated with the multi-PDSCH grant.

As shown in FIG. 11, for a carrier aggregation case, each component carrier may dynamically schedule single PDSCH grants or multi-PDSCH grants. For example, the base station may transmit, to the UE, a first DCI 1102 on a first component carrier, a second DCI 1104 on a second component carrier, a third DCI 1106 on the second component carrier, a fourth DCI 1108 on the first component carrier, and a fifth DCI 1110 on the second component carrier. The first DCI 1102 may be associated with a first multi-PDSCH grant that grants three PDSCHs (for example, slots 1, 2 and 3). The second DCI 1104 may be associated with a first single-PDSCH grant that grants slot 1. The third DCI 1106 may be associated with a second multi-PDSCH grant that grants two PDSCHs (for example, slots 3 and 4). The fourth DCI 1108 may be associated with a third multi-PDSCH grant that grants two PDSCHs (for example, slots 5 and 6). The fifth DCI may be associated with a second single-PDSCH grant that grants slot 6.

In some aspects, the UE may associate a first virtual DCI and a second virtual DCI with the first DCI 1102. The UE may associate a third virtual DCI with the third DCI 1106. The UE may associate a fourth virtual DCI with the fourth DCI 1108.

In some aspects, the DCIs and the virtual DCIs may be associated with both a counter DAI and a total DAI, which may enable the UE to detect missing multi-PDSCH grant(s) or missing single-PDSCH grant(s), similar to the single component carrier case. Further, the UE may perform ACK-NACK reporting for both the first component carrier and the second component carrier in a PUCCH associated with the first component carrier.

In some aspects, the UE may use virtual DCIs and actual DCIs to determine the counter DAI and the total DAI. For example, when a virtual DCI and an actual DCI start at a same symbol, the total DAI may be jointly counted and the counter DAI may be sequential similar to two actual DCIs being transmitted at the same time. In other words, the virtual DCI and the actual DCI may be considered to be from a same monitoring occasion.

In some aspects, a virtual DCI may be based on a detected location of an actual DCI. During a search space configuration, a symbol level offset may be defined for a virtual DCI to be introduced for each additional PDSCH in a multi-PDSCH grant. In one example, 14 symbol offsets may be introduced for each additional PDSCH. In another example, 7 symbol offsets may be introduced for each additional PDSCH, for example, when mini-slot level scheduling is supported.

In some aspects, one virtual DCI may be added per slot starting from symbol 0 of each slot after an actual DCI is received. In other words, when the actual DCI is received at the UE, the UE may add or identify one virtual DCI per slot (for example, until another actual DCI is received).

In some aspects, a location associated with the virtual DCI may not be associated with an actual search space monitoring configuration. In other words, the UE may not perform search space monitoring at the location associated with the virtual DCI.

Figure 12:
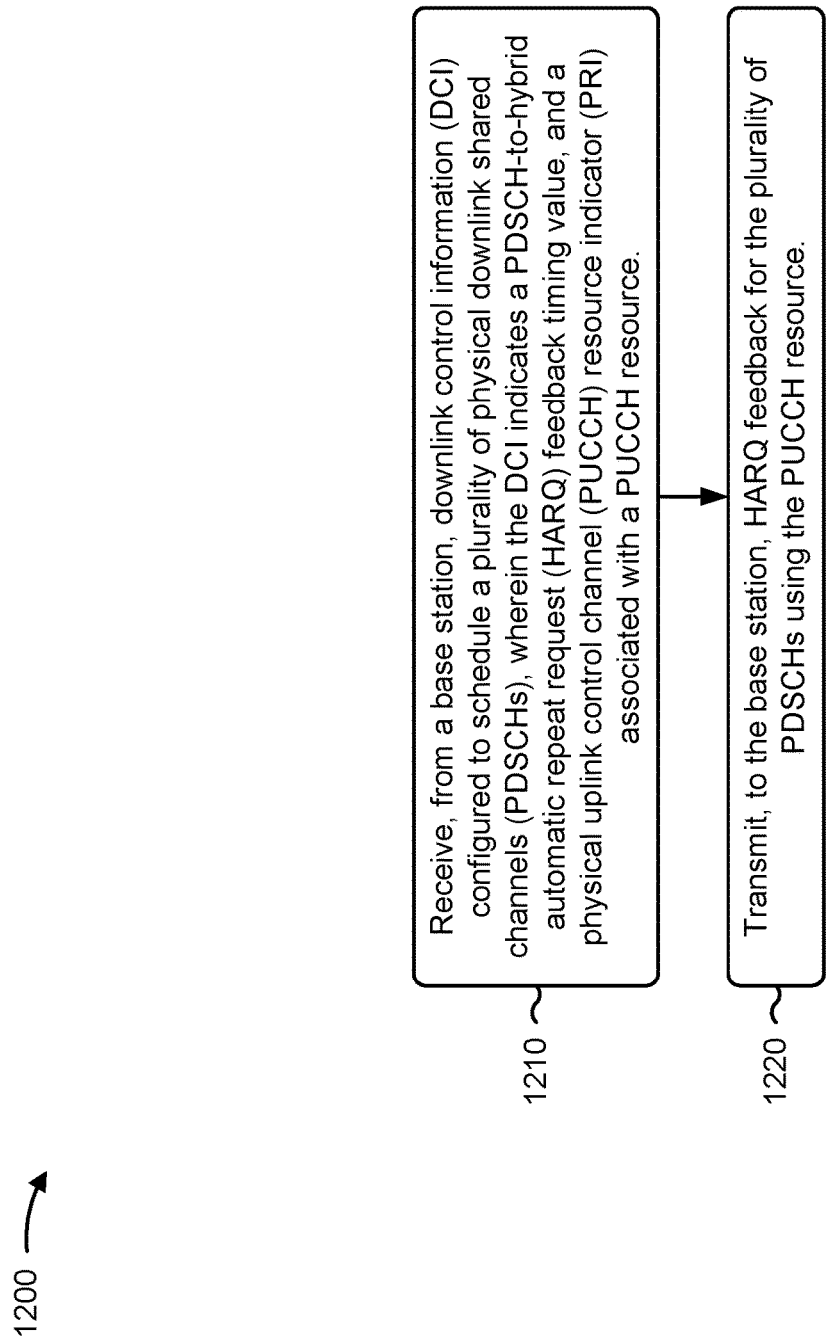
FIGS. 12-14 are diagrams illustrating example processes performed, for example, by a UE.

FIG. 12 is a diagram illustrating an example process 1200 performed, for example, by a UE. The process 1200 is an example where the UE (for example, UE 120) performs operations associated with ACK-NACK reporting for a downlink shared channel grant.

As shown in FIG. 12, in some aspects, the process 1200 may include receiving, from a base station, DCI configured to schedule a plurality of PDSCHs, where the DCI indicates: a PDSCH-to-HARQ feedback timing value, and a PRI associated with a PUCCH resource (block 1210). For example, the UE (such as by using reception component 1802, depicted in FIG. 18) may receive, from a base station, DCI configured to schedule a plurality of PDSCHs, where the DCI indicates: a PDSCH-to-HARQ feedback timing value, and a PRI associated with a PUCCH resource, as described herein.

As further shown in FIG. 12, in some aspects, the process 1200 may include transmitting, to the base station, HARQ feedback for the plurality of PDSCHs using the PUCCH resource (block 1220). For example, the UE (such as by using transmission component 1804, depicted in FIG. 18) may transmit, to the base station, HARQ feedback for the plurality of PDSCHs using the PUCCH resource, as described herein.

The process 1200 may include additional aspects, such as any single aspect or any combination of aspects described herein or in connection with one or more other processes described elsewhere herein.

In a first additional aspect, the PDSCH-to-HARQ feedback timing value corresponds to a time period between a last PDSCH in the plurality of PDSCHs and the PUCCH resource.

In a second additional aspect, alone or in combination with the first aspect, the HARQ feedback for the plurality of PDSCHs includes ACK or NACK associated with the plurality of PDSCHs.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

Figure 13:
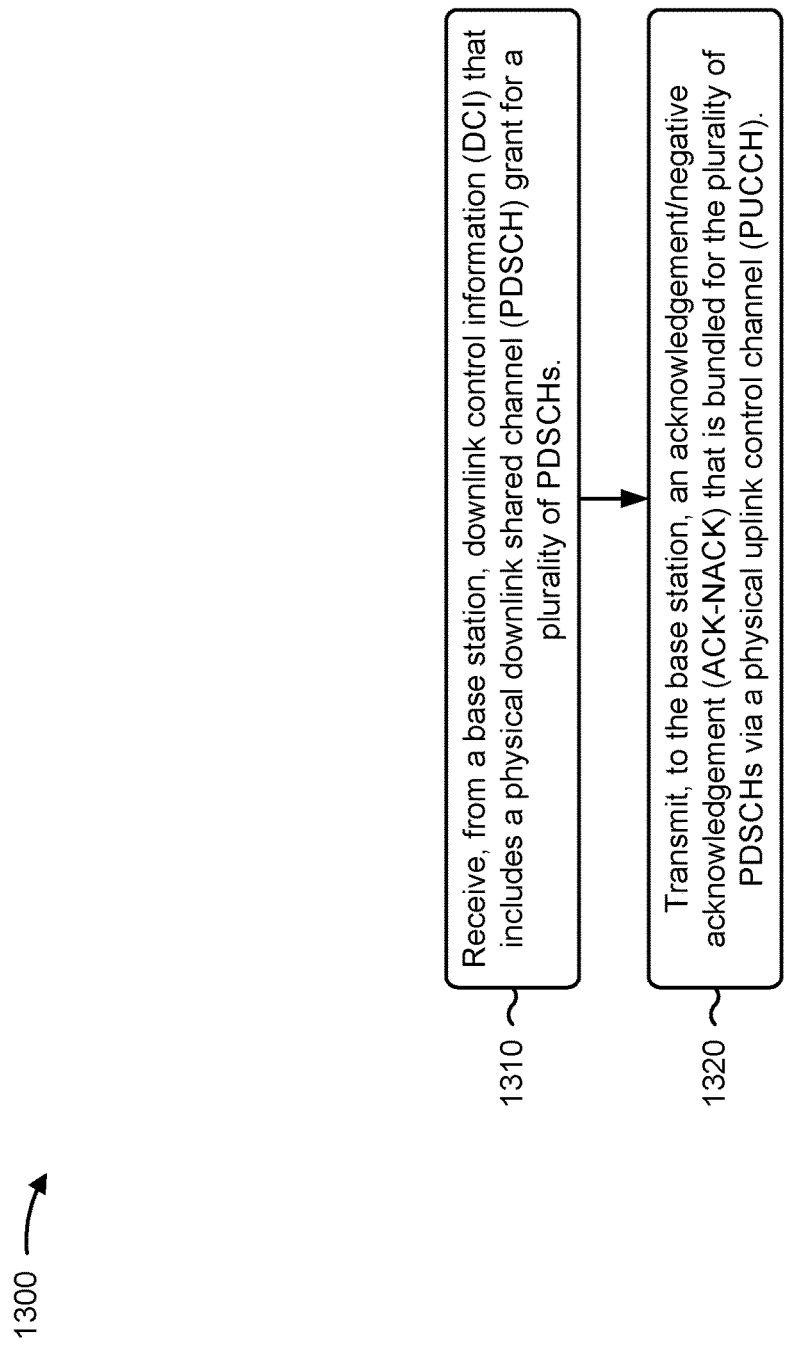

FIG. 13 is a diagram illustrating an example process 1300 performed, for example, by a UE. The process 1300 is an example where the UE (for example, UE 120) performs operations associated with ACK-NACK reporting for a downlink shared channel grant.

As shown in FIG. 13, in some aspects, the process 1300 may include receiving, from a base station, DCI that includes a PDSCH grant for a plurality of PDSCHs (block 1310). For example, the UE (such as by using reception component 1802, depicted in FIG. 18) may receive, from a base station, DCI that includes a PDSCH grant for a plurality of PDSCHs, as described herein.

As further shown in FIG. 13, in some aspects, the process 1300 may include transmitting, to the base station, an ACK-NACK that is bundled for the plurality of PDSCHs via a PUCCH (block 1320). For example, the UE (such as by using transmission component 1804, depicted in FIG. 18) may transmit, to the base station, an ACK-NACK that is bundled for the plurality of PDSCHs via a PUCCH, as described herein.

The process 1300 may include additional aspects, such as any single aspect or any combination of aspects described herein or in connection with one or more other processes described elsewhere herein.

In a first additional aspect, the PDSCH grant is a multi-PDSCH grant, and a size of the ACK-NACK that is bundled for the plurality of PDSCHs associated with the multi-PDSCH grant corresponds to a size of an ACK-NACK for a single PDSCH grant.

In a second additional aspect, alone or in combination with the first aspect, the PDSCH grant is associated with a counter DAI when a single component carrier is configured.

In a third additional aspect, alone or in combination with one or more of the first and second aspects, the PDSCH grant is a first PDSCH grant with a first counter DAI, where a second PDSCH grant that occurs later in time as compared to the first PDSCH grant is associated with a second counter DAI that is incremented from the first counter DAI, where the first PDSCH grant and the second PDSCH grant are associated with a same PUCCH reporting instance.

In a fourth additional aspect, alone or in combination with one or more of the first through third aspects, the process 1300 includes determining that the first PDSCH grant or the second PDSCH grant corresponds to a missing PDSCH grant based on the first counter DAI or the second counter DAI, and where transmitting the ACK-NACK includes transmitting a NACK for the missing PDSCH grant.

In a fifth additional aspect, alone or in combination with one or more of the first through fourth aspects, the PDSCH grant is associated with a counter DAI and a total DAI when carrier aggregation is enabled.

In a sixth additional aspect, alone or in combination with one or more of the first through fifth aspects, transmitting the ACK-NACK includes transmitting the ACK-NACK for the plurality of PDSCHs per DCI for a single codeword without spatial bundling and when a CBG ACK-NACK is not configured for the UE.

In a seventh additional aspect, alone or in combination with one or more of the first through sixth aspects, transmitting the ACK-NACK includes transmitting the ACK-NACK for the plurality of PDSCHs per DCI for a multi-codeword with spatial bundling and when a CBG ACK-NACK is not configured for the UE.

In an eighth additional aspect, alone or in combination with one or more of the first through seventh aspects, the ACK-NACK for the plurality of PDSCHs is one ACK-NACK bit.

In a ninth additional aspect, alone or in combination with one or more of the first through eighth aspects, transmitting the ACK-NACK includes transmitting the ACK-NACK for the plurality of PDSCHs for a multi-codeword and when a CBG ACK-NACK is not configured for the UE.

In a tenth additional aspect, alone or in combination with one or more of the first through ninth aspects, the ACK-NACK for each PDSCH included in the plurality of PDSCHs is two ACK-NACK bits.

In an eleventh additional aspect, alone or in combination with one or more of the first through tenth aspects, the ACK-NACK is bundled across PDSCHs in the plurality of PDSCHs.

In a twelfth additional aspect, alone or in combination with one or more of the first through eleventh aspects, the ACK-NACK is bundled spatially and associated with a sub-group of PDSCHs in the plurality of PDSCHs.

In a thirteenth additional aspect, alone or in combination with one or more of the first through twelfth aspects, transmitting the ACK-NACK includes transmitting, when a CBG ACK-NACK is configured with a single codeword, a plurality of bundled ACK-NACK bits, where each of the plurality of bundled ACK-NACK bits corresponds to a bundled transport block level feedback.

In a fourteenth additional aspect, alone or in combination with one or more of the first through thirteenth aspects, transmitting the ACK-NACK includes transmitting, when a CBG ACK-NACK is configured with a single codeword, a plurality of bundled ACK-NACK bits, where CBG ACK-NACKs for the plurality of PDSCHs are aggregated and split to form the plurality of bundled ACK-NACK bits.

In a fifteenth additional aspect, alone or in combination with one or more of the first through fourteenth aspects, transmitting the ACK-NACK includes transmitting, when a CBG ACK-NACK is configured with a single codeword, a plurality of bundled ACK-NACK bits, where each of the plurality of bundled ACK-NACK bits is based on an actual number of CBGs per transport block in the plurality of PDSCHs.

In a sixteenth additional aspect, alone or in combination with one or more of the first through fifteenth aspects, transmitting the ACK-NACK includes transmitting, when a CBG ACK-NACK is configured with multi-codewords, a plurality of bundled ACK-NACK bits for each codeword with no spatial bundling, where the plurality of bundled ACK-NACK bits correspond to a bundled transport block level feedback, the plurality of bundled ACK-NACK bits are based on CBG ACK-NACKs for the plurality of PDSCHs being aggregated and split to form the plurality of bundled ACK-NACK bits, or each of the plurality of bundled ACK-NACK bits is based on an actual number of CBGs per transport block in the plurality of PDSCHs.

In a seventeenth additional aspect, alone or in combination with one or more of the first through sixteenth aspects, transmitting the ACK-NACK includes transmitting, when a CBG ACK-NACK is configured with multi-codewords, a plurality of bundled ACK-NACK bits, where transport blocks are aggregated across codewords into a common pool and are bundled to the plurality of bundled ACK-NACK bits that are available.

In an eighteenth additional aspect, alone or in combination with one or more of the first through seventeenth aspects, transmitting the ACK-NACK includes transmitting, when a CBG ACK-NACK is configured with multi-codewords, a plurality of bundled ACK-NACK bits, where CBGs are aggregated across codewords into a common pool and are bundled to the plurality of bundled ACK-NACK bits that are available.

In a nineteenth additional aspect, alone or in combination with one or more of the first through eighteenth aspects, transmitting the ACK-NACK includes transmitting, when a CBG ACK-NACK is configured with multi-codewords, a plurality of bundled ACK-NACK bits, where an actual number of CBGs per transport block are aggregated across codewords into a common pool and are bundled to the plurality of bundled ACK-NACK bits that are available.

In a twentieth additional aspect, alone or in combination with one or more of the first through nineteenth aspects, transmitting the ACK-NACK includes transmitting, when a CBG ACK-NACK is configured with multi-codewords, a plurality of bundled ACK-NACK bits, where an aggregation of the plurality of PDSCHs occurs prior to an aggregation of the multi-codewords.

In a twenty-first additional aspect, alone or in combination with one or more of the first through twentieth aspects, transmitting the ACK-NACK includes transmitting, when a CBG ACK-NACK is configured with multi-codewords, a plurality of bundled ACK-NACK bits, where an aggregation of the multi-codewords occurs prior to an aggregation of the plurality of PDSCHs.

Although FIG. 13 shows example blocks of the process 1300, in some aspects, the process 1300 may include additional blocks, fewer blocks, different blocks, or differently arranged blocks than those depicted in FIG. 13. Additionally, or alternatively, two or more of the blocks of the process 1300 may be performed in parallel.

Figure 14:
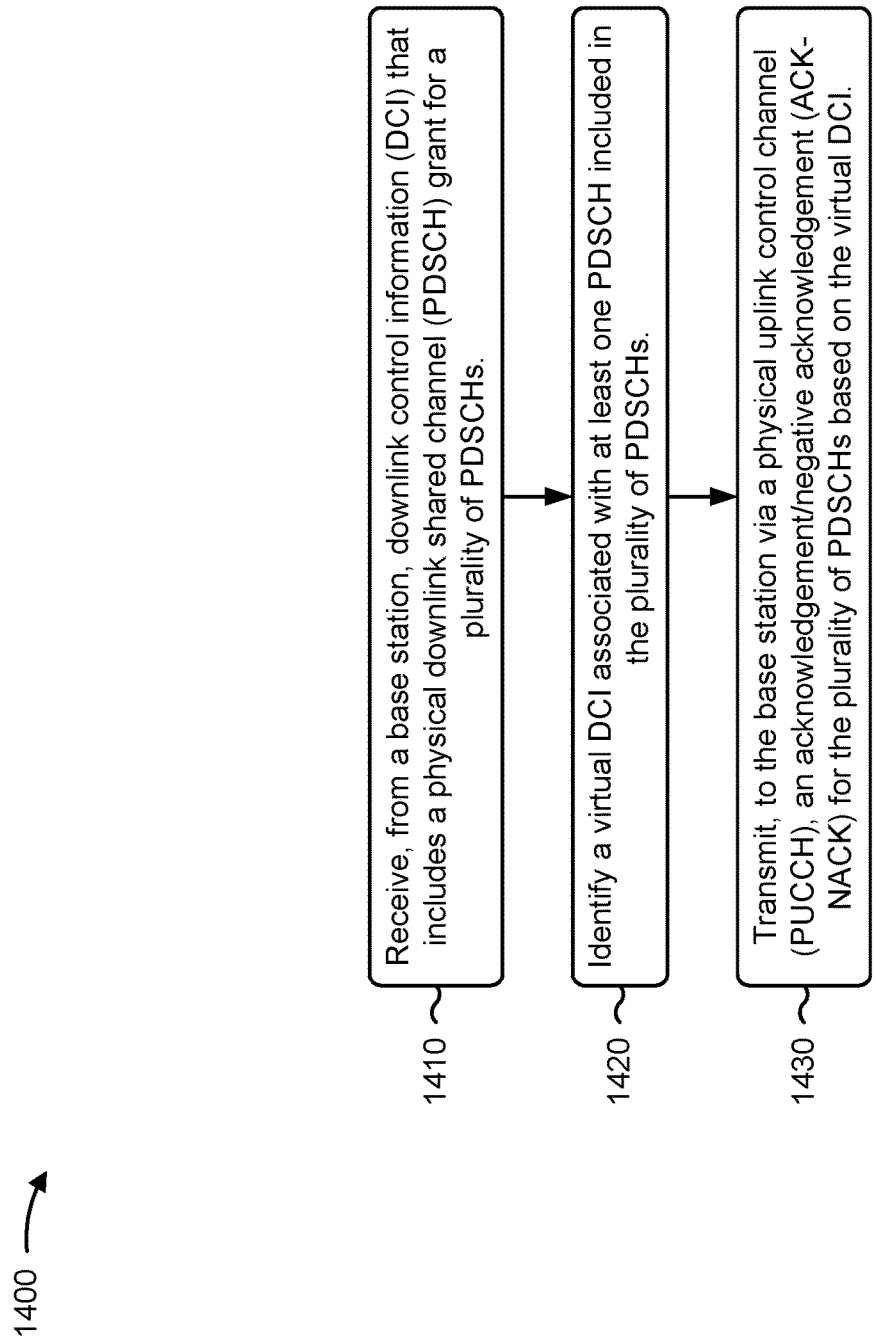

FIG. 14 is a diagram illustrating an example process 1400 performed, for example, by a UE. The process 1400 is an example where the UE (for example, UE 120) performs operations associated with ACK-NACK reporting for a downlink shared channel grant.

As shown in FIG. 14, in some aspects, the process 1400 may include receiving, from a base station, DCI that includes a PDSCH grant for a plurality of PDSCHs (block 1410). For example, the UE (such as by using reception component 1802, depicted in FIG. 18) may receive, from a base station, DCI that includes a PDSCH grant for a plurality of PDSCHs, as described herein.

As further shown in FIG. 14, in some aspects, the process 1400 may include identifying a virtual DCI associated with at least one PDSCH included in the plurality of PDSCHs (block 1420). For example, the UE (such as by using identification component 1810, depicted in FIG. 18) may identify a virtual DCI associated with at least one PDSCH included in the plurality of PDSCHs, as described herein.

As further shown in FIG. 14, in some aspects, the process 1400 may include transmitting, to the base station via a PUCCH, an ACK-NACK for the plurality of PDSCHs based on the virtual DCI (block 1430). For example, the UE (such as by using transmission component 1804, depicted in FIG. 18) may transmit, to the base station via a PUCCH, an ACK-NACK for the plurality of PDSCHs based on the virtual DCI, as described herein.

The process 1400 may include additional aspects, such as any single aspect or any combination of aspects described herein or in connection with one or more other processes described elsewhere herein.

In a first additional aspect, a first counter DAI included in the DCI that includes the PDSCH grant is associated with a first PDSCH in the plurality of PDSCHs, and a subsequent counter DAI is associated with a remaining PDSCH in the plurality of PDSCHs.

In a second additional aspect, alone or in combination with the first aspect, the subsequent counter DAI for the remaining PDSCH is associated with the virtual DCI.

In a third additional aspect, alone or in combination with one or more of the first and second aspects, for one or more DCIs and virtual DCIs that are associated with a same PUCCH reporting instance, counter DAIs associated with the one or more DCIs and virtual DCIs are incremental to enable the UE to detect one or more missing PDSCH grants.

In a fourth additional aspect, alone or in combination with one or more of the first through third aspects, the PDSCH grant is associated with a single component carrier.

In a fifth additional aspect, alone or in combination with one or more of the first through fourth aspects, the PDSCH grant is associated with a counter DAI and a total DAI when carrier aggregation is enabled.

In a sixth additional aspect, alone or in combination with one or more of the first through fifth aspects, the virtual DCI is configured in accordance with a defined symbol level offset with respect to the PDSCH grant for each PDSCH in the PDSCH grant.

In a seventh additional aspect, alone or in combination with one or more of the first through sixth aspects, the virtual DCI is configured in each slot after the DCI associated with the PDSCH grant is received from the base station.

Although FIG. 14 shows example blocks of the process 1400, in some aspects, the process 1400 may include additional blocks, fewer blocks, different blocks, or differently arranged blocks than those depicted in FIG. 14. Additionally, or alternatively, two or more of the blocks of the process 1400 may be performed in parallel.

Figure 15:
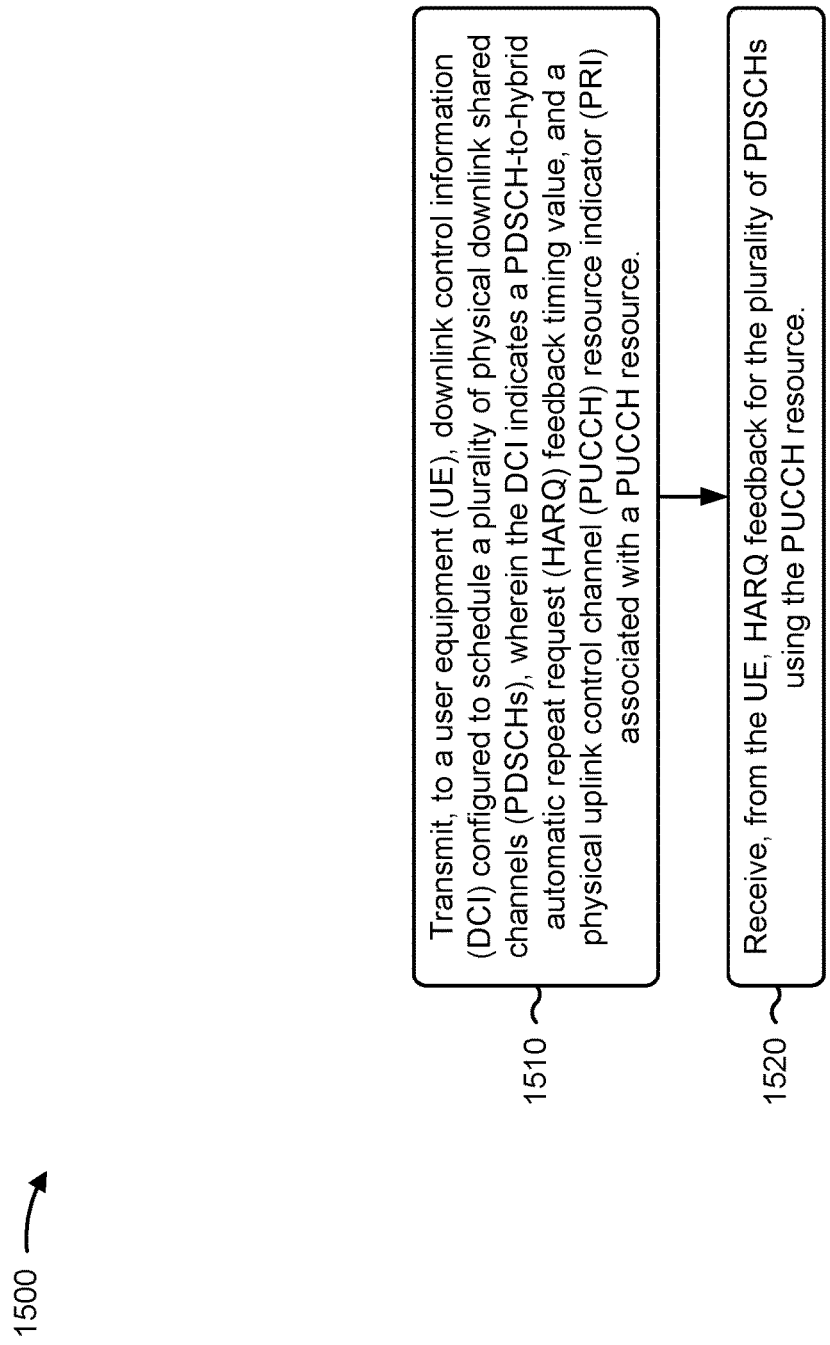
FIGS. 15-17 are diagrams illustrating example processes performed, for example, by a BS.

FIG. 15 is a diagram illustrating an example process 1500 performed, for example, by a base station (BS). The process 1500 is an example where the base station (for example, base station 110) performs operations associated with ACK-NACK reporting for a downlink shared channel grant.

As shown in FIG. 15, in some aspects, the process 1500 may include transmitting, to a UE, DCI configured to schedule a plurality of PDSCHs, where the DCI indicates: a PDSCH-to-HARQ feedback timing value, and a PRI associated with a PUCCH resource (block 1510). For example, the base station (such as by using transmission component 1904, depicted in FIG. 19) may transmit, to a UE, DCI configured to schedule a plurality of PDSCHs, where the DCI indicates: a PDSCH-to-HARQ feedback timing value, and a PRI associated with a PUCCH resource, as described herein.

As further shown in FIG. 15, in some aspects, the process 1500 may include receiving, from the UE, HARQ feedback for the plurality of PDSCHs using the PUCCH resource (block 1520). For example, the base station (such as by using reception component 1902, depicted in FIG. 19) may receive, from the UE, HARQ feedback for the plurality of PDSCHs using the PUCCH resource, as described herein.

The process 1500 may include additional aspects, such as any single aspect or any combination of aspects described herein or in connection with one or more other processes described elsewhere herein.

In a first additional aspect, the PDSCH-to-HARQ feedback timing value corresponds to a time period between a last PDSCH in the plurality of PDSCHs and the PUCCH resource.

In a second additional aspect, alone or in combination with the first aspect, the HARQ feedback for the plurality of PDSCHs includes an ACK or NACK associated with the plurality of PDSCHs.

Although FIG. 15 shows example blocks of the process 1500, in some aspects, the process 1500 may include additional blocks, fewer blocks, different blocks, or differently arranged blocks than those depicted in FIG. 15. Additionally, or alternatively, two or more of the blocks of the process 1500 may be performed in parallel.

Figure 16:
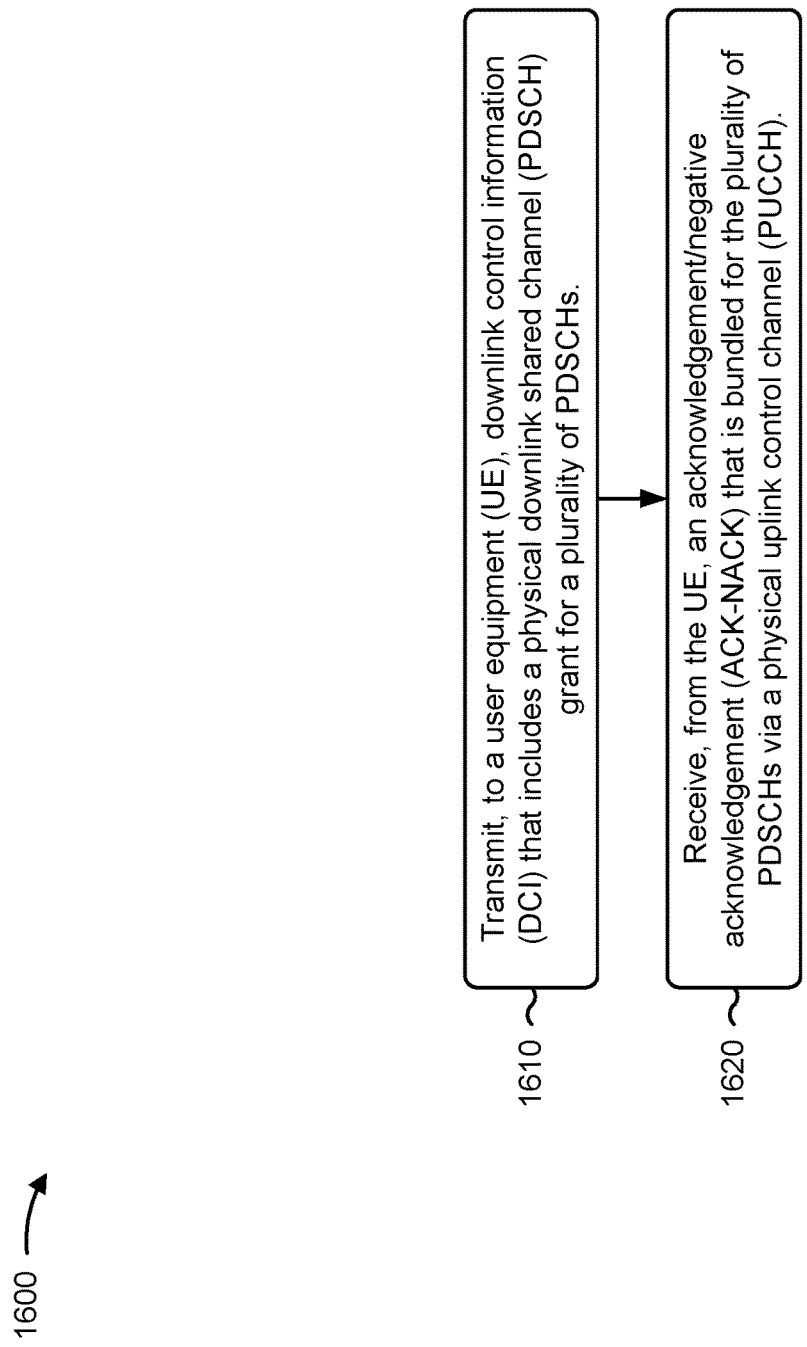

FIG. 16 is a diagram illustrating an example process 1600 performed, for example, by a base station (BS). The process 1600 is an example where the base station (for example, base station 110) performs operations associated with ACK-NACK reporting for a downlink shared channel grant.

As shown in FIG. 16, in some aspects, the process 1600 may include transmitting, to a UE, DCI that includes a PDSCH grant for a plurality of PDSCHs (block 1610). For example, the base station (such as by using transmission component 1904, depicted in FIG. 19) may transmit, to a UE, DCI that includes a PDSCH grant for a plurality of PDSCHs, as described herein.

As further shown in FIG. 16, in some aspects, the process 1600 may include receiving, from the UE, an ACK-NACK that is bundled for the plurality of PDSCHs via a PUCCH (block 1620). For example, the base station (such as by using reception component 1902, depicted in FIG. 19) may receive, from the UE, an ACK-NACK that is bundled for the plurality of PDSCHs via a PUCCH, as described herein.

The process 1600 may include additional aspects, such as any single aspect or any combination of aspects described herein or in connection with one or more other processes described elsewhere herein.

In a first additional aspect, a size of the ACK-NACK that is bundled for the plurality of PDSCHs associated with the PDSCH grant corresponds to a size of an ACK-NACK for a single PDSCH grant.

In a second additional aspect, alone or in combination with the first aspect, the PDSCH grant is associated with a counter DAI when a single component carrier is configured.

In a third additional aspect, alone or in combination with one or more of the first and second aspects, the PDSCH grant is a first PDSCH grant with a first counter DAI, where a second PDSCH grant that occurs later in time as compared to the first PDSCH grant is associated with a second counter DAI that is incremented from the first counter DAI, where the first PDSCH grant and the second PDSCH grant are associated with a same PUCCH reporting instance.

In a fourth additional aspect, alone or in combination with one or more of the first through third aspects, the first PDSCH grant or the second PDSCH grant is detected to correspond to a missing PDSCH grant based on the first counter DAI or the second counter DAI.

In a fifth additional aspect, alone or in combination with one or more of the first through fourth aspects, the PDSCH grant is associated with a counter DAI and a total DAI when carrier aggregation is enabled.

In a sixth additional aspect, alone or in combination with one or more of the first through fifth aspects, receiving the ACK-NACK includes receiving the ACK-NACK for the plurality of PDSCHs per DCI for a single codeword without spatial bundling and when a CBG ACK-NACK is not configured for the UE.

In a seventh additional aspect, alone or in combination with one or more of the first through sixth aspects, receiving the ACK-NACK includes receiving the ACK-NACK for the plurality of PDSCHs per DCI for a multi-codeword with spatial bundling and when a CBG ACK-NACK is not configured for the UE.

In an eighth additional aspect, alone or in combination with one or more of the first through seventh aspects, the ACK-NACK for the plurality of PDSCHs is one ACK-NACK bit.

In a ninth additional aspect, alone or in combination with one or more of the first through eighth aspects, receiving the ACK-NACK includes receiving the ACK-NACK for the plurality of PDSCHs for a multi-codeword and when a CBG ACK-NACK is not configured for the UE.

In a tenth additional aspect, alone or in combination with one or more of the first through ninth aspects, the ACK-NACK for each PDSCH included in the plurality of PDSCHs is two ACK-NACK bits.

In an eleventh additional aspect, alone or in combination with one or more of the first through tenth aspects, the ACK-NACK is bundled across PDSCHs in the plurality of PDSCHs.

In a twelfth additional aspect, alone or in combination with one or more of the first through eleventh aspects, the ACK-NACK is bundled spatially and associated with a sub-group of PDSCHs in the plurality of PDSCHs.

In a thirteenth additional aspect, alone or in combination with one or more of the first through twelfth aspects, receiving the ACK-NACK includes receiving, when a CBG ACK-NACK is configured with a single codeword, a plurality of bundled ACK-NACK bits, where each of the plurality of bundled ACK-NACK bits corresponds to a bundled transport block level feedback.

In a fourteenth additional aspect, alone or in combination with one or more of the first through thirteenth aspects, receiving the ACK-NACK includes receiving, when a CBG ACK-NACK is configured with a single codeword, a plurality of bundled ACK-NACK bits, where CBG ACK-NACKs for the plurality of PDSCHs are aggregated and split to form the plurality of bundled ACK-NACK bits.

In a fifteenth additional aspect, alone or in combination with one or more of the first through fourteenth aspects, receiving the ACK-NACK includes receiving, when a CBG ACK-NACK is configured with a single codeword, a plurality of bundled ACK-NACK bits, where each of the plurality of bundled ACK-NACK bits is based on an actual number of CBGs per transport block in the plurality of PDSCHs.

In a sixteenth additional aspect, alone or in combination with one or more of the first through fifteenth aspects, receiving the ACK-NACK includes receiving, when a CBG ACK-NACK is configured with multi-codewords, a plurality of bundled ACK-NACK bits for each codeword with no spatial bundling, where the plurality of bundled ACK-NACK bits correspond to a bundled transport block level feedback, the plurality of bundled ACK-NACK bits are based on CBG ACK-NACKs for the plurality of PDSCHs being aggregated and split to form the plurality of bundled ACK-NACK bits, or each of the plurality of bundled ACK-NACK bits is based on an actual number of CBGs per transport block in the plurality of PDSCHs.

In a seventeenth additional aspect, alone or in combination with one or more of the first through sixteenth aspects, receiving the ACK-NACK includes receiving, when a CBG ACK-NACK is configured with multi-codewords, a plurality of bundled ACK-NACK bits, where transport blocks are aggregated across codewords into a common pool and are bundled to the plurality of bundled ACK-NACK bits that are available.

In an eighteenth additional aspect, alone or in combination with one or more of the first through seventeenth aspects, receiving the ACK-NACK includes receiving, when a CBG ACK-NACK is configured with multi-codewords, a plurality of bundled ACK-NACK bits, where CBGs are aggregated across codewords into a common pool and are bundled to the plurality of bundled ACK-NACK bits that are available.

In a nineteenth additional aspect, alone or in combination with one or more of the first through eighteenth aspects, receiving the ACK-NACK includes receiving, when a CBG ACK-NACK is configured with multi-codewords, a plurality of bundled ACK-NACK bits, where an actual number of CBGs per transport block are aggregated across codewords into a common pool and are bundled to the plurality of bundled ACK-NACK bits that are available.

In a twentieth additional aspect, alone or in combination with one or more of the first through nineteenth aspects, receiving the ACK-NACK includes receiving, when a CBG ACK-NACK is configured with multi-codewords, a plurality of bundled ACK-NACK bits, where an aggregation of the plurality of PDSCHs occurs prior to an aggregation of the multi-codewords.

In a twenty-first additional aspect, alone or in combination with one or more of the first through twentieth aspects, receiving the ACK-NACK includes receiving, when a CBG ACK-NACK is configured with multi-codewords, a plurality of bundled ACK-NACK bits, where an aggregation of the multi-codewords occurs prior to an aggregation of the plurality of PDSCHs.

Although FIG. 16 shows example blocks of the process 1600, in some aspects, the process 1600 may include additional blocks, fewer blocks, different blocks, or differently arranged blocks than those depicted in FIG. 16. Additionally, or alternatively, two or more of the blocks of the process 1600 may be performed in parallel.

Figure 17:
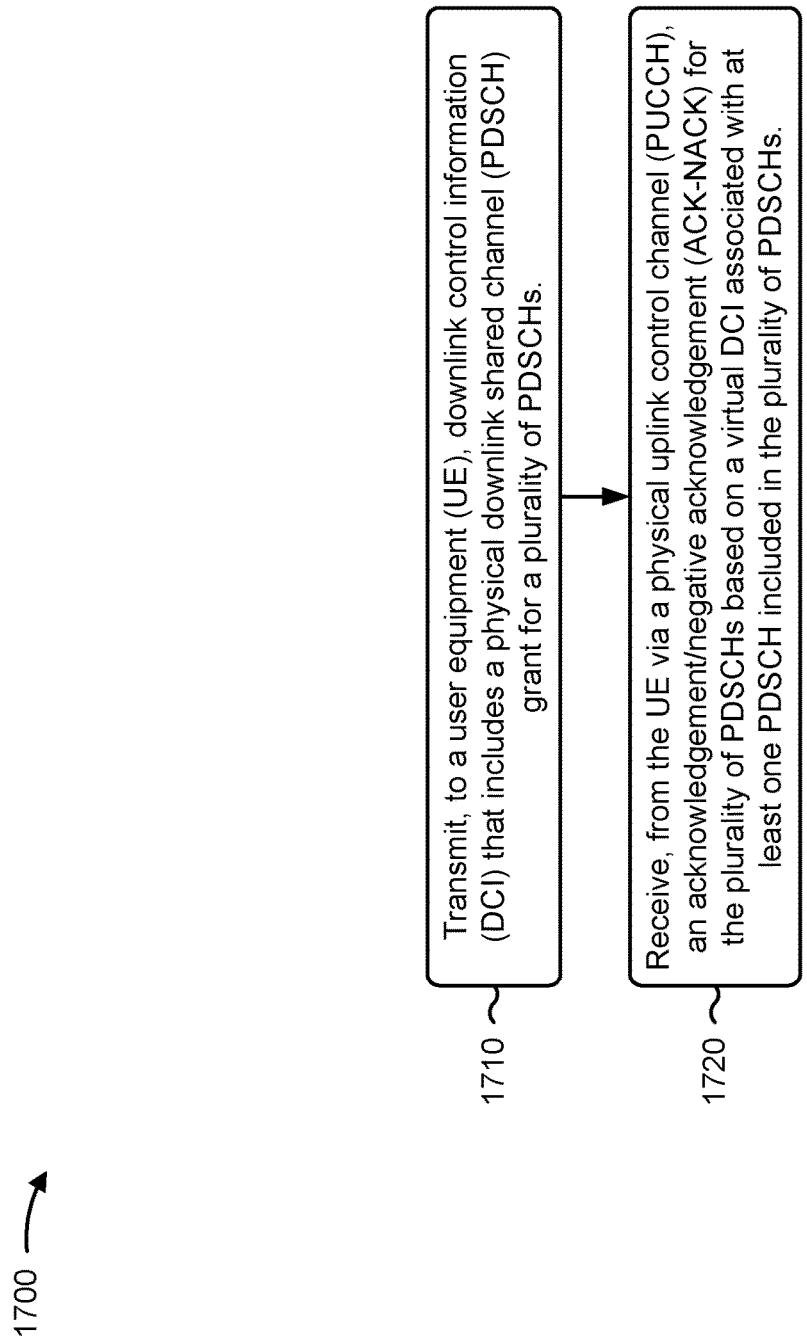

FIG. 17 is a diagram illustrating an example process 1700 performed, for example, by a base station (BS). The process 1700 is an example where the base station (for example, base station 110) performs operations associated with ACK-NACK reporting for a downlink shared channel grant.

As shown in FIG. 17, in some aspects, the process 1700 may include transmitting, to a UE, DCI that includes a PDSCH grant for a plurality of PDSCHs (block 1710). For example, the base station (such as by using transmission component 1904, depicted in FIG. 19) may transmit, to a UE, DCI that includes a PDSCH grant for a plurality of PDSCHs, as described herein.

As further shown in FIG. 17, in some aspects, the process 1700 may include receiving, from the UE via a PUCCH, an ACK-NACK for the plurality of PDSCHs based on a virtual DCI associated with at least one PDSCH included in the plurality of PDSCHs (block 1720). For example, the base station (such as by using reception component 1902, depicted in FIG. 19) may receive, from the UE via a PUCCH, an ACK-NACK for the plurality of PDSCHs based on a virtual DCI associated with at least one PDSCH included in the plurality of PDSCHs, as described herein.

The process 1700 may include additional aspects, such as any single aspect or any combination of aspects described herein or in connection with one or more other processes described elsewhere herein.

In a first additional aspect, a first counter DAI included in the DCI that includes the PDSCH grant is associated with a first PDSCH in the plurality of PDSCHs, and a subsequent counter DAI is associated with a remaining PDSCH in the plurality of PDSCHs.

In a second additional aspect, alone or in combination with the first aspect, the subsequent counter DAI for the remaining PDSCH is associated with the virtual DCI.

In a third additional aspect, alone or in combination with one or more of the first and second aspects, for one or more DCIs and virtual DCIs that are associated with a same PUCCH reporting instance, counter DAIs associated with the one or more DCIs and virtual DCIs are incremental to enable the UE to detect one or more missing PDSCH grants.

In a fourth additional aspect, alone or in combination with one or more of the first through third aspects, the PDSCH grant is associated with a single component carrier.

In a fifth additional aspect, alone or in combination with one or more of the first through fourth aspects, the PDSCH grant is associated with a counter DAI and a total DAI when carrier aggregation is enabled.

In a sixth additional aspect, alone or in combination with one or more of the first through fifth aspects, the virtual DCI is configured in accordance with a defined symbol level offset with respect to the PDSCH grant for each PDSCH in the PDSCH grant.

In a seventh additional aspect, alone or in combination with one or more of the first through sixth aspects, the virtual DCI is configured in each slot after the DCI associated with the PDSCH grant is received from the base station.

Although FIG. 17 shows example blocks of the process 1700, in some aspects, the process 1700 may include additional blocks, fewer blocks, different blocks, or differently arranged blocks than those depicted in FIG. 17. Additionally, or alternatively, two or more of the blocks of the process 1700 may be performed in parallel.

Figure 18:
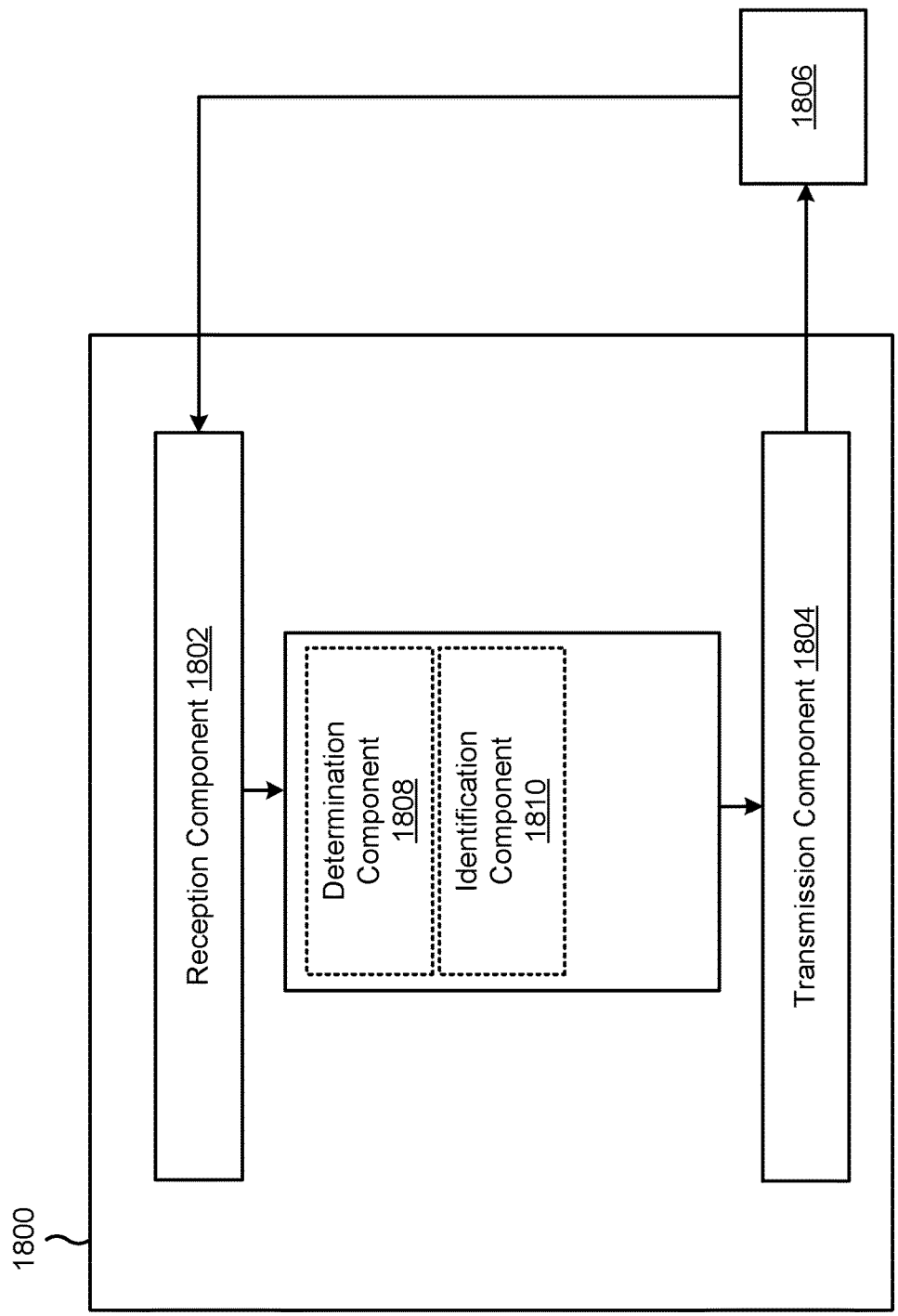
FIGS. 18 and 19 are block diagrams of example apparatuses for wireless communication.

FIG. 18 is a block diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses or one or more other components). As shown, the apparatus 1800 may communicate with another apparatus 1806 (such as a UE, a base station, or another wireless communication device) using the reception component 1802 and the transmission component 1804. As further shown, the apparatus 1800 may include one or more of a determination component 1808, or an identification component 1810, among other examples.

In some aspects, the apparatus 1800 may be configured to perform one or more operations described herein in connection with FIGS. 4-11. Additionally, or alternatively, the apparatus 1800 may be configured to perform one or more processes described herein, such as process 1200 of FIG. 12, process 1300 of FIG. 13, process 1400 of FIG. 14, or a combination thereof. In some aspects, the apparatus 1800 or one or more components shown in FIG. 18 may include one or more components of the UE described herein in connection with FIG. 2. Additionally, or alternatively, one or more components shown in FIG. 18 may be implemented within one or more components described herein in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the UE described herein in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described herein in connection with FIG. 2. In some aspects, the transmission component 1804 may be collocated with the reception component 1802 in a transceiver.

The reception component 1802 may receive, from a base station, DCI configured to schedule a plurality of PDSCHs, where the DCI indicates a PDSCH-to-HARQ feedback timing value, and a PRI associated with a PUCCH resource. The transmission component 1804 may transmit, to the base station, HARQ feedback for the plurality of PDSCHs using the PUCCH resource.

The reception component 1802 may receive, from a base station, DCI that includes a PDSCH grant for a plurality of PDSCHs. The transmission component 1804 may transmit, to the base station, an ACK-NACK that is bundled for the plurality of PDSCHs via a PUCCH.

The determination component 1808 may determine that the first PDSCH grant or the second PDSCH grant corresponds to a missing PDSCH grant based on the first counter DAI or the second counter DAI. In some aspects, the determination component 1808 may include one or more antennas, a demodulator, a MIMO detector, a receive processor, a modulator, a transmit MIMO processor, a transmit processor, a controller/processor, a memory, or a combination thereof, of the UE described herein in connection with FIG. 2. The transmission component 1804 may transmit a NACK for the missing PDSCH grant.

The transmission component 1804 may transmit the ACK-NACK for the plurality of PDSCHs per DCI for a single codeword without spatial bundling and when a CBG ACK-NACK is not configured for the UE.

The transmission component 1804 may transmit the ACK-NACK for the plurality of PDSCHs per DCI for a multi-codeword with spatial bundling and when a CBG ACK-NACK is not configured for the UE.

The transmission component 1804 may transmit the ACK-NACK for the plurality of PDSCHs for a multi-codeword and when a CBG ACK-NACK is not configured for the UE.

The transmission component 1804 may transmit, when a CBG ACK-NACK is configured with a single codeword, a plurality of bundled ACK-NACK bits, where each of the plurality of bundled ACK-NACK bits corresponds to a bundled transport block level feedback.

The transmission component 1804 may transmit, when a CBG ACK-NACK is configured with a single codeword, a plurality of bundled ACK-NACK bits, where CBG ACK-NACKs for the plurality of PDSCHs are aggregated and split to form the plurality of bundled ACK-NACK bits.

The transmission component 1804 may transmit, when a CBG ACK-NACK is configured with a single codeword, a plurality of bundled ACK-NACK bits, where each of the plurality of bundled ACK-NACK bits is based on an actual number of CBGs per transport block in the plurality of PDSCHs.

The transmission component 1804 may transmit, when a CBG ACK-NACK is configured with multi-codewords, a plurality of bundled ACK-NACK bits for each codeword with no spatial bundling, where the plurality of bundled ACK-NACK bits correspond to a bundled transport block level feedback, the plurality of bundled ACK-NACK bits are based on CBG ACK-NACKs for the plurality of PDSCHs being aggregated and split to form the plurality of bundled ACK-NACK bits, or each of the plurality of bundled ACK-NACK bits is based on an actual number of CBGs per transport block in the plurality of PDSCHs.

The transmission component 1804 may transmit, when a CBG ACK-NACK is configured with multi-codewords, a plurality of bundled ACK-NACK bits, where transport blocks are aggregated across codewords into a common pool and are bundled to the plurality of bundled ACK-NACK bits that are available.

The transmission component 1804 may transmit, when a CBG ACK-NACK is configured with multi-codewords, a plurality of bundled ACK-NACK bits, where CBGs are aggregated across codewords into a common pool and are bundled to the plurality of bundled ACK-NACK bits that are available.

The transmission component 1804 may transmit, when a CBG ACK-NACK is configured with multi-codewords, a plurality of bundled ACK-NACK bits, where an actual number of CBGs per transport block are aggregated across codewords into a common pool and are bundled to the plurality of bundled ACK-NACK bits that are available.

The transmission component 1804 may transmit, when a CBG ACK-NACK is configured with multi-codewords, a plurality of bundled ACK-NACK bits, where an aggregation of the plurality of PDSCHs occurs prior to an aggregation of the multi-codewords.

The transmission component 1804 may transmit, when a CBG ACK-NACK is configured with multi-codewords, a plurality of bundled ACK-NACK bits, where an aggregation of the multi-codewords occurs prior to an aggregation of the plurality of PDSCHs.

The reception component 1802 may receive, from a base station, DCI that includes a PDSCH grant for a plurality of PDSCHs. The identification component 1810 may identify a virtual DCI associated with at least one PDSCH included in the plurality of PDSCHs. In some aspects, the identification component 1810 may include one or more antennas, a demodulator, a MIMO detector, a receive processor, a modulator, a transmit MIMO processor, a transmit processor, a controller/processor, a memory, or a combination thereof, of the UE described herein in connection with FIG. 2. The transmission component 1804 may transmit, to the base station via a PUCCH, an ACK-NACK for the plurality of PDSCHs based on the virtual DCI.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
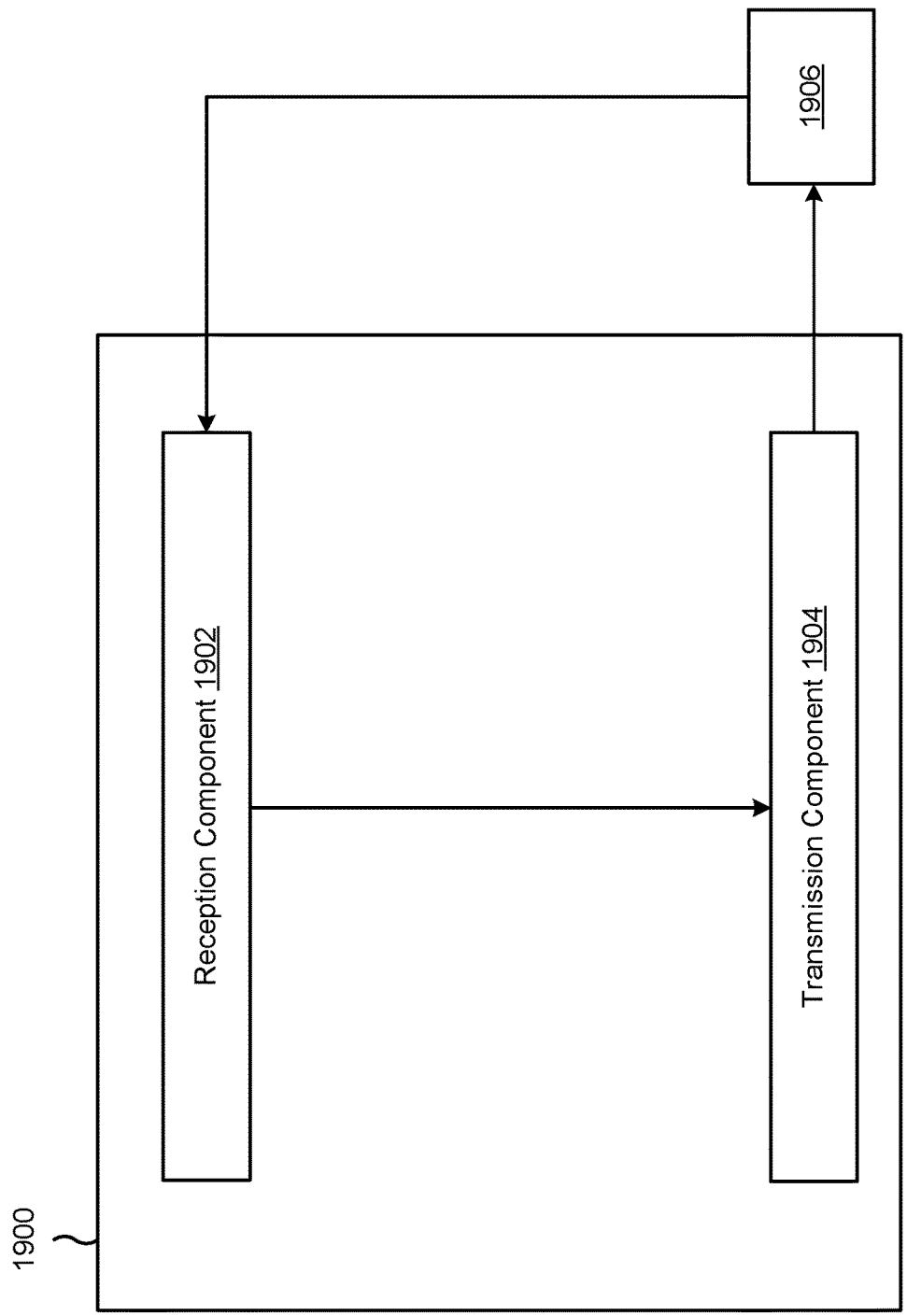

FIG. 19 is a block diagram of an example apparatus 1900 for wireless communication. The apparatus 1900 may be a base station, or a base station may include the apparatus 1900. In some aspects, the apparatus 1900 includes a reception component 1902 and a transmission component 1904, which may be in communication with one another (for example, via one or more buses or one or more other components). As shown, the apparatus 1900 may communicate with another apparatus 1906 (such as a UE, a base station, or another wireless communication device) using the reception component 1902 and the transmission component 1904.

In some aspects, the apparatus 1900 may be configured to perform one or more operations described herein in connection with FIGS. 4-11. Additionally, or alternatively, the apparatus 1900 may be configured to perform one or more processes described herein, such as process 1500 of FIG. 15, process 1600 of FIG. 16, process 1700 of FIG. 17, or a combination thereof. In some aspects, the apparatus 1900 or one or more components shown in FIG. 19 may include one or more components of the base station described herein in connection with FIG. 2. Additionally, or alternatively, one or more components shown in FIG. 19 may be implemented within one or more components described herein in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a demodulator, a MIMO detector, a receive processor, a controller/processor, a memory, or a combination thereof, of the base station described herein in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the base station described herein in connection with FIG. 2. In some aspects, the transmission component 1904 may be collocated with the reception component 1902 in a transceiver.

The transmission component 1904 may transmit, to a UE, DCI configured to schedule a plurality of PDSCHs, where the DCI indicates a PDSCH-to-HARQ feedback timing value, and a PRI associated with a PUCCH resource. The reception component 1902 may receive, from the UE, HARQ feedback for the plurality of PDSCHs using the PUCCH resource.

The reception component 1902 may receive, to a UE, DCI that includes a PDSCH grant for a plurality of PDSCHs. The reception component 1902 may receive, from the UE, an ACK-NACK that is bundled for the plurality of PDSCHs via a PUCCH.

The reception component 1902 may receive the ACK-NACK for the plurality of PDSCHs per DCI for a single codeword without spatial bundling and when a CBG ACK-NACK is not configured for the UE.

The reception component 1902 may receive the ACK-NACK for the plurality of PDSCHs per DCI for a multi-codeword with spatial bundling and when a CBG ACK-NACK is not configured for the UE.

The reception component 1902 may receive the ACK-NACK for the plurality of PDSCHs for a multi-codeword and when a CBG ACK-NACK is not configured for the UE.

The reception component 1902 may receive, when a CBG ACK-NACK is configured with a single codeword, a plurality of bundled ACK-NACK bits, where each of the plurality of bundled ACK-NACK bits corresponds to a bundled transport block level feedback.

The reception component 1902 may receive, when a CBG ACK-NACK is configured with a single codeword, a plurality of bundled ACK-NACK bits, where CBG ACK-NACKs for the plurality of PDSCHs are aggregated and split to form the plurality of bundled ACK-NACK bits.

The reception component 1902 may receive, when a CBG ACK-NACK is configured with a single codeword, a plurality of bundled ACK-NACK bits, where each of the plurality of bundled ACK-NACK bits is based on an actual number of CBGs per transport block in the plurality of PDSCHs.

The reception component 1902 may receive, when a CBG ACK-NACK is configured with multi-codewords, a plurality of bundled ACK-NACK bits for each codeword with no spatial bundling, where the plurality of bundled ACK-NACK bits correspond to a bundled transport block level feedback, the plurality of bundled ACK-NACK bits are based on CBG ACK-NACKs for the plurality of PDSCHs being aggregated and split to form the plurality of bundled ACK-NACK bits, or each of the plurality of bundled ACK-NACK bits is based on an actual number of CBGs per transport block in the plurality of PDSCHs.

The reception component 1902 may receive, when a CBG ACK-NACK is configured with multi-codewords, a plurality of bundled ACK-NACK bits, where transport blocks are aggregated across codewords into a common pool and are bundled to the plurality of bundled ACK-NACK bits that are available.

The reception component 1902 may receive, when a CBG ACK-NACK is configured with multi-codewords, a plurality of bundled ACK-NACK bits, where CBGs are aggregated across codewords into a common pool and are bundled to the plurality of bundled ACK-NACK bits that are available.

The reception component 1902 may receive, when a CBG ACK-NACK is configured with multi-codewords, a plurality of bundled ACK-NACK bits, where an actual number of CBGs per transport block are aggregated across codewords into a common pool and are bundled to the plurality of bundled ACK-NACK bits that are available.

The reception component 1902 may receive, when a CBG ACK-NACK is configured with multi-codewords, a plurality of bundled ACK-NACK bits, where an aggregation of the plurality of PDSCHs occurs prior to an aggregation of the multi-codewords.

The reception component 1902 may receive, when a CBG ACK-NACK is configured with multi-codewords, a plurality of bundled ACK-NACK bits, where an aggregation of the multi-codewords occurs prior to an aggregation of the plurality of PDSCHs.

The transmission component 1904 may transmit, to a UE, DCI that includes a PDSCH grant for a plurality of PDSCHs. The reception component 1902 may receive, from the UE via a PUCCH, an ACK-NACK for the plurality of PDSCHs based on a virtual DCI associated with at least one PDSCH included in the plurality of PDSCHs.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:

receiving, from a base station, downlink control information (DCI) that includes a physical downlink shared channel (PDSCH) grant configured to schedule a plurality of PDSCHs, wherein the PDSCH grant is associated with a total downlink assignment indicator (DAI) when carrier aggregation is enabled, and wherein the DCI indicates:
   a PDSCH-to-hybrid automatic repeat request (HARQ) feedback timing value, and
   a physical uplink control channel (PUCCH) resource indicator (PRI) associated with a PUCCH resource, the PDSCH-to-HARQ feedback timing value corresponding to a time period between a last PDSCH in the plurality of PDSCHs and the PUCCH resource; and
transmitting, to the base station and using a fixed feedback size in the PUCCH resource, HARQ acknowledgement/negative acknowledgement (ACK-NACK) feedback that is bundled for the plurality of PDSCHs in accordance with:
   a spatial bundling configuration with respect to bundling the plurality of PDSCHs, and
   a code block group (CBG) ACK-NACK configuration for the UE.

2. The method of claim 1, wherein the HARQ ACK-NACK feedback for the plurality of PDSCHs includes an acknowledgement (ACK) or negative acknowledgement (NACK) associated with the plurality of PDSCHs.

3. The method of claim 1, wherein the PDSCH grant is a multi-PDSCH grant.

4. The method of claim 3, wherein a size of the HARQ ACK-NACK feedback that is bundled for the plurality of PDSCHs associated with the multi-PDSCH grant corresponds to a size of HARQ ACK-NACK feedback for a single PDSCH grant.

5. The method of claim 1, wherein the PDSCH grant is associated with a counter DAI.

6. A method of wireless communication performed by an apparatus of a user equipment (UE), comprising:
receiving, from a base station, first downlink control information (DCI) that includes a first physical downlink shared channel (PDSCH) grant for a plurality of PDSCHs, wherein:
   the first PDSCH grant is associated with a first counter downlink assignment indicator (DAI),
   the first PDSCH grant is associated with a total DAI when carrier aggregation is enabled,
   a second PDSCH grant that is included in second DCI and occurs later in time as compared to the first PDSCH grant is associated with a second counter DAI that is incremented from the first counter DAI, and
   the first PDSCH grant and the second PDSCH grant are associated with a same physical uplink control channel (PUCCH) reporting instance; and
transmitting, to the base station via a PUCCH, an acknowledgement/negative acknowledgement (ACK-NACK) that is bundled for the plurality of PDSCHs in accordance with:
   a spatial bundling configuration with respect to bundling the plurality of PDSCHs, and
   a code block group (CBG) ACK-NACK configuration for the UE.

7. The method of claim 6, wherein the first PDSCH grant is a multi-PDSCH grant, and a size of the ACK-NACK that is bundled for the plurality of PDSCHs associated with the multi-PDSCH grant corresponds to a size of an ACK-NACK for a single PDSCH grant.

8. The method of claim 6, wherein the first PDSCH grant is associated with the first counter DAI when a single component carrier is configured.

9. The method of claim 6, further comprising:
determining that the first PDSCH grant or the second PDSCH grant corresponds to a missing PDSCH grant based on the first counter DAI or the second counter DAI, and
wherein transmitting the ACK-NACK includes transmitting a negative acknowledgement (NACK) for the missing PDSCH grant.

10. The method of claim 6, wherein transmitting the ACK-NACK includes:
transmitting the ACK-NACK for the plurality of PDSCHs per DCI for a single codeword without spatial bundling or for a multi-codeword with the spatial bundling.

11. The method of claim 6, wherein the ACK-NACK for the plurality of PDSCHs is one ACK-NACK bit.

12. The method of claim 6, wherein transmitting the ACK-NACK includes:
transmitting the ACK-NACK for the plurality of PDSCHs for a multi-codeword and without the CBG ACK-NACK for the UE.

13. The method of claim 12, wherein the ACK-NACK for each PDSCH included in the plurality of PDSCHs is two ACK-NACK bits.

14. The method of claim 12, wherein the ACK-NACK is bundled across PDSCHs in the plurality of PDSCHs.

15. The method of claim 12, wherein the ACK-NACK is bundled spatially and associated with a sub-group of PDSCHs in the plurality of PDSCHs.

16. An apparatus for wireless communication at a user equipment (UE), comprising:
one or more memories storing processor-executable code; and
one or more processors coupled with the one or more memories, at least one processor of the one or more processors configured to cause the UE to:
   obtain downlink control information (DCI) that includes a physical downlink shared channel (PDSCH) grant configured to schedule a plurality of PDSCHs, wherein the PDSCH grant is associated with a total downlink assignment indicator (DAI) when carrier aggregation is enabled, and wherein the DCI indicates:
      a PDSCH-to-hybrid automatic repeat request (HARQ) feedback timing value, and
      a physical uplink control channel (PUCCH) resource indicator (PRI) associated with a PUCCH resource, the PDSCH-to-HARQ feedback timing value corresponding to a time period between a last PDSCH in the plurality of PDSCHs and the PUCCH resource; and
   output, using a fixed feedback size in the PUCCH resource, HARQ acknowledgement/negative acknowledgement (ACK-NACK) feedback that is bundled for the plurality of PDSCHs in accordance with:
      a spatial bundling configuration with respect to bundling the plurality of PDSCHs, and
      a code block group (CBG) ACK-NACK configuration for the UE.

17. The apparatus of claim 16, wherein the HARQ feedback for the plurality of PDSCHs includes an acknowledgement (ACK) or negative acknowledgement (NACK) associated with the plurality of PDSCHs.

18. The apparatus of claim 16, wherein the PDSCH grant is a multi-PDSCH grant.

19. The apparatus of claim 18, wherein a size of the HARQ ACK-NACK feedback that is bundled for the plurality of PDSCHs associated with the multi-PDSCH grant corresponds to a size of HARQ ACK-NACK feedback for a single PDSCH grant.

20. The apparatus of claim 16, wherein the PDSCH grant is associated with a counter DAI.

21. An apparatus for wireless communication at a user equipment (UE), comprising:
   one or more memories storing processor-executable code; and
   one or more processors coupled with the one or more memories, at least one processor of the one or more processors configured to cause the UE to:
      obtain first downlink control information (DCI) that includes a first physical downlink shared channel (PDSCH) grant for a plurality of PDSCHs, wherein:
         the first PDSCH grant is associated with a first counter downlink assignment indicator (DAI),
         the first PDSCH grant is associated with a total DAI when carrier aggregation is enabled,
         a second PDSCH grant that is included in second DCI and occurs later in time as compared to the first PDSCH grant is associated with a second counter DAI that is incremented from the first counter DAI, and
         the first PDSCH grant and the second PDSCH grant are associated with a same physical uplink control channel (PUCCH) reporting instance; and
      output via a PUCCH, an acknowledgement/negative acknowledgement (ACK-NACK) that is bundled for the plurality of PDSCHs in accordance with:
         a spatial bundling configuration with respect to bundling the plurality of PDSCHs, and
         a code block group (CBG) ACK-NACK configuration for the UE.

22. The apparatus of claim 21, wherein the first PDSCH grant is a multi-PDSCH grant, and a size of the ACK-NACK that is bundled for the plurality of PDSCHs associated with the multi-PDSCH grant corresponds to a size of an ACK-NACK for a single PDSCH grant.

23. The apparatus of claim 21, wherein the first PDSCH grant is associated with the first counter DAI when a single component carrier is configured.

24. The apparatus of claim 21, wherein at least one processor of the one or more processors is further configured to cause the UE to:
   determine that the first PDSCH grant or the second PDSCH grant corresponds to a missing PDSCH grant based on the first counter DAI or the second counter DAI, and
   output a negative acknowledgement (NACK) for the missing PDSCH grant.

25. The apparatus of claim 21, wherein at least one processor of the one or more processors is further configured to cause the UE to:
   output the ACK-NACK for the plurality of PDSCHs per DCI for a single codeword without spatial bundling or for a multi-codeword with the spatial bundling.

26. The apparatus of claim 21, wherein the ACK-NACK for the plurality of PDSCHs is one ACK-NACK bit.

27. The apparatus of claim 21, wherein at least one processor of the one or more processors is further configured to cause the UE to:
   output the ACK-NACK for the plurality of PDSCHs for a multi-codeword and without the CBG ACK-NACK for the UE.

28. The apparatus of claim 27, wherein the ACK-NACK for each PDSCH included in the plurality of PDSCHs is two ACK-NACK bits.

29. The apparatus of claim 27, wherein the ACK-NACK is bundled across PDSCHs in the plurality of PDSCHs.

30. The apparatus of claim 27, wherein the ACK-NACK is bundled spatially and associated with a sub-group of PDSCHs in the plurality of PDSCHs.

* * * * *